(12) United States Patent
Labbe et al.

(10) Patent No.: US 7,967,044 B2
(45) Date of Patent: Jun. 28, 2011

(54) PROTECTIVE GUARD MEMBERS FOR CUTTING TOOTH ASSEMBLIES MOUNTED ON A BRUSH CUTTING HEAD

(75) Inventors: Etienne Labbe, Sainte-Marie (CA); Rene Boivin, Scott (CA)

(73) Assignee: Usitech Nov Inc., Sainte-Marie de Beauce, QC (CA)

( * ) Notice: Subject to any disclaimer, the term of this patent is extended or adjusted under 35 U.S.C. 154(b) by 210 days.

(21) Appl. No.: 12/222,901

(22) Filed: Aug. 19, 2008

(65) Prior Publication Data
US 2010/0044487 A1 Feb. 25, 2010

(51) Int. Cl.
*B27C 1/00* (2006.01)

(52) U.S. Cl. .......... 144/231; 144/172; 241/294; 407/48; 407/59

(58) Field of Classification Search ................ 144/24.12, 144/24.13, 172, 174, 218, 220, 221, 230–237; 241/101.72, 101.762, 242, 294, 295, 191, 241/189.1, 55; 56/249, 294; 407/40, 48, 407/51, 58, 59
See application file for complete search history.

(56) References Cited

U.S. PATENT DOCUMENTS

| | | | | |
|---|---|---|---|---|
| 4,714,204 A | * | 12/1987 | John et al. ........... | 241/55 |
| 5,259,428 A | * | 11/1993 | Matthews .............. | 144/231 |
| 6,079,649 A | * | 6/2000 | Balvanz et al. ........ | 241/189.1 |
| 6,311,910 B1 | * | 11/2001 | Balvanz et al. ........ | 241/191 |
| 6,464,157 B1 | * | 10/2002 | Balvanz et al. ........ | 241/191 |
| 6,764,035 B2 | | 7/2004 | Denis et al. | |
| 7,055,770 B2 | * | 6/2006 | Bardos ................... | 241/189.1 |
| 2007/0181725 A1 | | 8/2007 | Edwards | |
| 2007/0261763 A1 | | 11/2007 | Labbe | |

FOREIGN PATENT DOCUMENTS

| | | |
|---|---|---|
| WO | WO/98/46355 | 10/1998 |
| WO | WO/02/32576 | 4/2002 |
| WO | WO/03/099000 | 12/2003 |
| WO | WO/2005/046874 | 5/2005 |
| WO | WO/2005/046875 | 5/2005 |
| WO | WO/2007/034038 | 3/2007 |

* cited by examiner

*Primary Examiner* — Dana Ross
*Assistant Examiner* — Jennifer Chiang
(74) *Attorney, Agent, or Firm* — Ogilvy Renault LLP

(57) ABSTRACT

The present invention relates generally to brush cutting heads, and more specifically, to protective guard members for cutting tooth assemblies mounted on brush cutting heads. A brush cutting head includes a support body having a first end, an opposed second end and an intermediate portion extending therebetween. The intermediate portion has an outer surface. A plurality of collars is mounted to the support body at spaced intervals along the intermediate portion with each collar extending outwardly from the outer surface. The brush cutting head further also has a plurality of cutting teeth assemblies carried on the outer surface of the support body. Each cutting tooth assembly is associated with at least one collar. Also provided is at least one guard member for protecting at least one cutting tooth of the plurality from impacts with hard objects. The at least one guard member is carried on one of the collars with at least a portion thereof projecting beyond the outermost edge of the one collar. The at least one guard member has an outermost margin which defines a protective envelope that at least partially encompasses the at least one cutting tooth.

25 Claims, 17 Drawing Sheets

PROTECTIVE GUARD MEMBERS FOR CUTTING TOOTH ASSEMBLIES MOUNTED ON A BRUSH CUTTING HEAD

FIELD OF THE INVENTION

The present invention relates generally to brush cutting heads, and more specifically, to protective guard members for cutting tooth assemblies mounted on brush cutting heads.

BACKGROUND OF THE INVENTION

Extensive felling and mulching operations are often performed with a heavy-duty brush cutter mounted to the front of a work vehicle. A typical brush cutter includes a brush cutting head provided with an elongate support body that carries about its outer surface a plurality of teeth adapted to cut trees, brush or the like. The cutting teeth are typically fixed to the outer surface of the drum via mounting blocks.

To protect the cutting tooth and its associated mounting assembly, certain brush cutting heads have been provided with protective collars. One such brush cutting head is described in U.S. Pat. No. 6,764,035. This patent discloses a brush cutting head that has a cylindrical support base and a plurality of cutting tooth mounting blocks fastened to the outer surface of the base. The bottom surface of each mounting block is concavely curved to match the radius of the base thereby allowing each mounting block to be welded onto the base with its bottom surface flush with the outer surface of the base. Each mounting block carries a cutting tooth on its front face. To protect the mounting blocks from rocks, each mounting block is provided with a protective collar. Each protective collar is welded to the outer surface of the base and extends radially therefrom, transverse to the longitudinal axis of the base. Each collar terminates circumferentially a short distance from the front face of the mounting block with which it is associated to provide a front clearance space. The opposed end of the collar is welded to the back face of the associated mounting block to strengthen it.

While the protective collars described in U.S. Pat. No. 6,764,035 afford the cutting tooth assemblies some protection, the cutting teeth remain nonetheless exposed to violent impact with hard objects, like stones, and thus are still vulnerable to damage during brush cutting operations.

United States Patent Application Publication No. 2007/0261763 describes a brush cutting head provided with differently configured collars and cutting tooth assemblies. This brush cutting head has a cylindrical support body with a curved outer surface and a plurality of penannular collars. The collars are mounted to the support body at spaced apart locations and extend radially from its curved outer surface. Each collar cooperates with an adjacent collar to define a mounting station between adjacent collars. A plurality of cutting tooth assemblies are carried on the outer surface of the support body. Each cutting tooth assembly has a cutting tooth for placement within a mounting station, and a mounting assembly engageable with the adjacent collars to secure the cutting tooth in the mounting station.

By having the cutting tooth and its associated mounting assembly disposed between adjacent collars, two-fold protection is afforded to the cutting teeth. The collars shield the cutting teeth from rocks and other hard objects and reduce the stresses to which the cutting teeth are subjected during operations by improving the distribution of forces through the mounting assembly.

While the brush cutting head described in United States Patent Application Publication No. 2007/0261763 has proven itself successful on the field and constitutes an improvement over what was previously available on the market, efforts continue to be made to lengthen the service life of the cutting teeth and their mounting assemblies by reducing the incidence of destructive impact with rocks. In light of the foregoing, it would be advantageous to have a brush cutting head with improved means for protecting cutting teeth and their mounting assemblies from violent impact with hard objects. Preferably, such protection means would be relatively easy to fabricate and install and would not add significant weight to the brush cutting head so as to minimize power consumption.

SUMMARY OF THE INVENTION

In accordance with one embodiment of the present invention, there is provided a brush cutting head. The brush cutting head has a support body with a first end, an opposed second end and an intermediate portion extending therebetween. The intermediate portion has an outer surface. A plurality of collars is mounted to the support body at spaced intervals along the intermediate portion. Each collar extends outwardly from the outer surface. The brush cutting head also includes a plurality of cutting teeth carried on the outer surface of the support body. Each cutting tooth is associated with at least one collar. Also provided is at least one guard member for protecting at least one cutting tooth of the plurality from impacts with hard objects. The at least one guard member is carried on one of the collars with at least a portion thereof projecting beyond the outermost edge of the one collar.

In an additional feature, the at least one guard member has an outermost margin. The outermost margin defines a protective envelope that at least partially encompasses the at least one cutting tooth.

In a further feature, the plurality of collars includes first, second, third and fourth collars; the second collar is disposed between the first and third collars and the third collar is disposed between the second and fourth collars. The at least one guard member includes first, second, third and fourth guard members. The first guard member is carried on the first collar; the second guard member is carried on the second collar; the third guard member is carried on the third collar and the fourth guard member is carried on the fourth collar.

Additionally, the support body is a cylindrical support body. The outer surface of the support body is a curved surface defining the circumference of the support body. The first guard member is circumferentially spaced from the second guard member; the second guard member is circumferentially spaced from the third guard member; and the third guard member is circumferentially spaced from the fourth guard member. In an additional feature, the first guard member is circumferentially spaced from the third guard member by a first acute angle and the second guard member is circumferentially spaced from the fourth guard member by a second acute angle. The first acute angle equals the second acute angle. In yet another additional feature, the first guard member is circumferentially spaced from the second guard member by a first obtuse angle and the third guard member is circumferentially spaced from the fourth guard member by a second obtuse angle. The first obtuse angle equals the second obtuse angle. The second guard member is positioned so as to be substantially opposed to the third guard member.

In still another feature, the plurality of cutting teeth includes first, second and third cutting teeth. The first cutting tooth is mounted between the first and second collars; the second cutting tooth is mounted between the second and third collars; and the third cutting tooth is mounted between the third and fourth collars. The second guard member is disposed forwardly of the first cutting tooth. The third guard member is disposed forwardly of the second cutting tooth. The fourth guard member is disposed forwardly of the third cutting tooth. Further still, the outermost edge of each of the first and second guard members defines a protective envelope. The protective envelope defined by the first guard member at least partially encompasses the second cutting tooth; and the protective envelope defined by the second guard member at least partially encompasses the third cutting tooth. Additionally, each cutting tooth has a cutting portion terminating with a leading cutting edge. The protective envelope defined by the first guard member substantially encompasses the cutting portion of the second cutting tooth. Optionally, the protective envelope defined by the first guard member entirely encompasses the cutting edge of the second cutting tooth.

In yet another feature, the plurality of cutting tooth includes first, second, third and fourth cutting tooth. The first cutting tooth is associated with the first collar; the second cutting tooth is associated with the second collar; the third cutting tooth is associated with the third collar; and the fourth cutting tooth is associated with the fourth collar. The outermost edge of each of the first, second, third and fourth guard members defines a protective envelope. The protective envelope defined by the first guard member at least partially encompasses the second cutting tooth; the protective envelope defined by the second guard member at least partially encompasses the first cutting tooth; the protective envelope defined by the third guard member at least partially encompasses the fourth cutting tooth; and the protective envelope defined by the fourth guard member at least partially encompasses the third cutting tooth. Additionally, each cutting tooth has a cutting portion terminating with a leading cutting edge. The protective envelope defined by the first guard member substantially encompasses the cutting portion of the second cutting tooth. Optionally, the protective envelope defined by the first guard member entirely encompasses the cutting edge of the second cutting tooth. As a further option, the protective envelope defined by the first guard member entirely encompasses the second cutting tooth.

In a further feature, each cutting tooth has a cutting portion terminating with a leading cutting edge. The plurality of cutting tooth includes first, second, third and fourth cutting tooth. The first cutting tooth is associated with the first collar; the second cutting tooth is associated with the second collar; the third cutting tooth is associated with the third collar; and the fourth cutting tooth is associated with the fourth collar. Each of the first, second, third and fourth guard members has a leading end and a trailing end. The leading end of the second guard member is disposed forwardly of the leading cutting edge of the first cutting tooth.

In still another feature, the at least one guard member has a first portion mounted to the one collar and a second portion joined to the first portion. The portion of the at least one guard member projecting beyond the outermost edge of the one collar corresponds substantially to the second guard member portion. The first portion is welded to the second portion. In a first alternative feature, the first portion is integrally formed with the second portion. In a second alternative feature, the first portion is releasably attached to the second portion.

In yet another feature, the one collar has a substantially penannular structure defined by a circumferentially extending sidewall. The sidewall has an inner edge fixed to the outer edge of the support body and an outer edge. The outer edge of the sidewall corresponds to the outermost edge of the one collar. The first guard member portion is releasably attached to the sidewall of the one collar. The sidewall of the one collar has a pair of apertures defined therein and the first guard member portion has a pair of apertures defined therein. The pair of apertures defined in the first guard member portion is aligned with the pair of apertures defined in the second guard member portion so as to permit fasteners to be received therethrough.

In a further feature, the second guard member portion is at least partially supported on the outer edge of the sidewall.

In another feature, the second portion includes a crescent-shaped body defined substantially by a convex edge and an opposed concave edge. The convex edge defines the outermost margin of the at least one guard member. The concave edge conforms substantially to the curvature of the outer edge of the sidewall. Each of the first and second guard member portions has an abutment face and an opposite face. At the juncture between the first and second guard member portions, the abutment face of the first guard member portion bears against the abutment face of the second guard member portion along a margin. A portion of the abutment face of the first guard member portion cooperates with the concave edge of the second guard member portion to define a shoulder. The shoulder abuts a portion of the sidewall and outer edge of the one collar. In the vicinity of the convex edge, the second guard member portion has a thickness measured between the abutment face and opposite face thereof. The thickness of the second guard member portion in the vicinity of the convex edge corresponds substantially to the thickness of the collar as measured between the opposed faces thereof.

In still another feature, the crescent-shaped body has a leading end and a trailing end. The leading end is a mirror image of the trailing end. In alternate feature, the trailing end terminates with a bull-nose tip to provide increased protective coverage for the at least one cutting tooth.

In yet another feature, the second guard member portion has a curved edge constituting the outermost margin of the at least one guard member. The curved edge defines a protective envelope that at least partially encompasses the at least one cutting tooth. The curved edge is a convex edge.

In a further feature, the at least one guard member is releasably attached to the one collar. In a first alternative feature, the at least one guard member is fixedly mounted to the one collar. In a second alternative feature, the at least one guard member is integrally formed with the one collar.

BRIEF DESCRIPTION OF THE DRAWINGS

The embodiments of the present invention shall be more clearly understood with reference to the following detailed description of the embodiments of the invention taken in conjunction with the accompanying drawings, in which:

FIG. 18 is a front left perspective view of an alternative brush cutting head to that shown in FIG. 2a;

DETAILED DESCRIPTION OF THE EMBODIMENTS OF THE INVENTION

Figure 1:
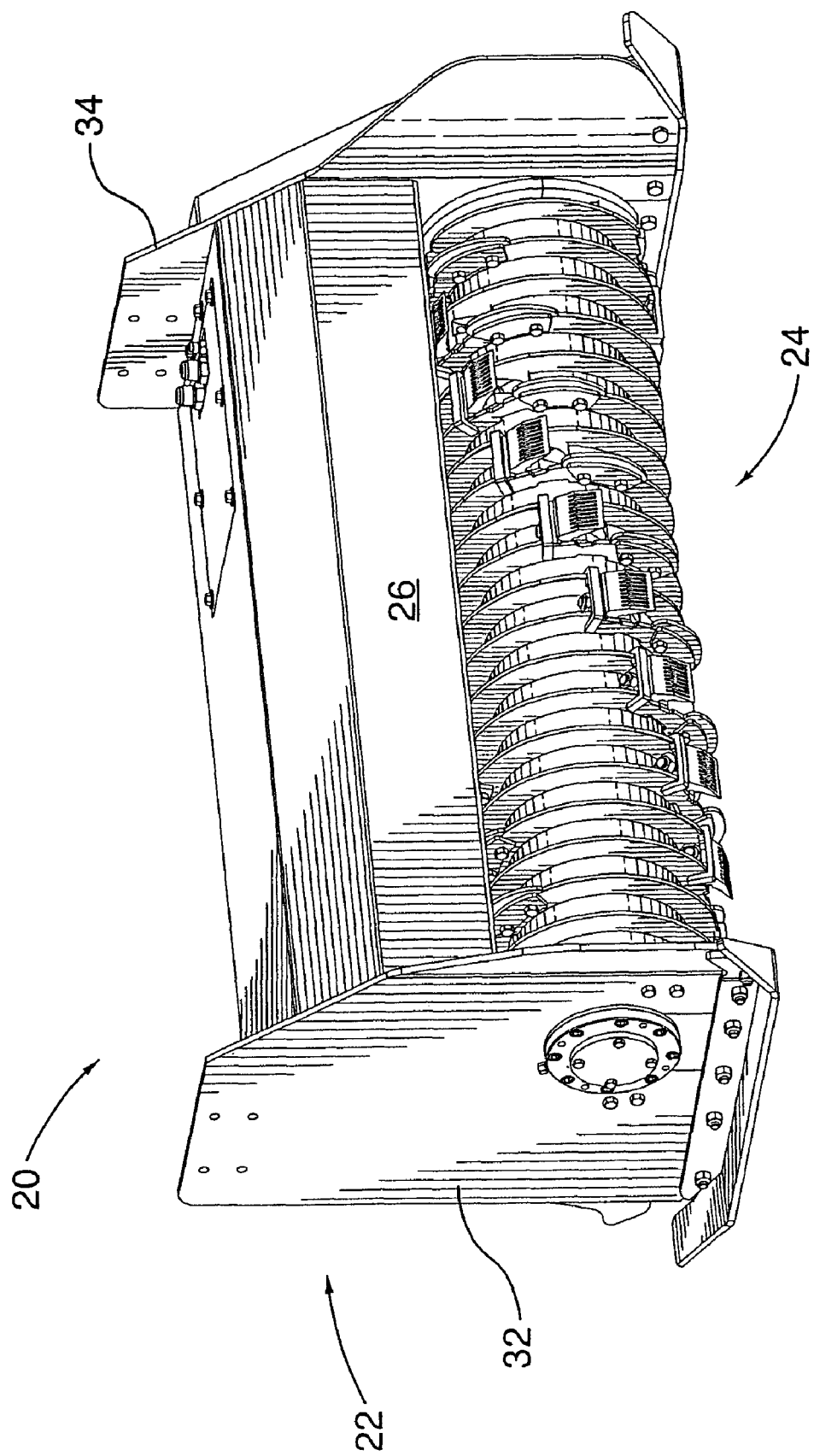
FIG. 1 is a front right perspective view of a brush cutter according to a first embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIG. 1, there is shown a brush cutter generally designated with reference numeral 20. Brush cutter 20 may be of the type attached to the front of a vehicle, such as a loader, skid steer, or the like. Brush cutter 20 includes an open-bottom housing 22 and a brush cutting head 24 rotatably mounted within the housing 22. The housing 22 is defined generally by a front cover panel 26, a rear cover panel 28 and a pair of side panels 32 and 34. The cover panels 26 and 28 extend longitudinally between, and are joined to, the side panels 32 and 34. A curved wall (not shown) disposed within the interior of the housing 22 spans the space between the side panels 32 and 34, its curved profile partially defining a well 36 sized to accommodate the brush cutting head 24. The brush cutting head 24 is mounted longitudinally between the side panels 32 and 34 and supported on bearing assemblies (not shown) for rotational motion about an axis of rotation R-R (shown in FIGS. 2a and 2b). A drive assembly (not shown) is operatively connected to the brush cutting head 24 to drive rotation thereof.

Figure 2A:
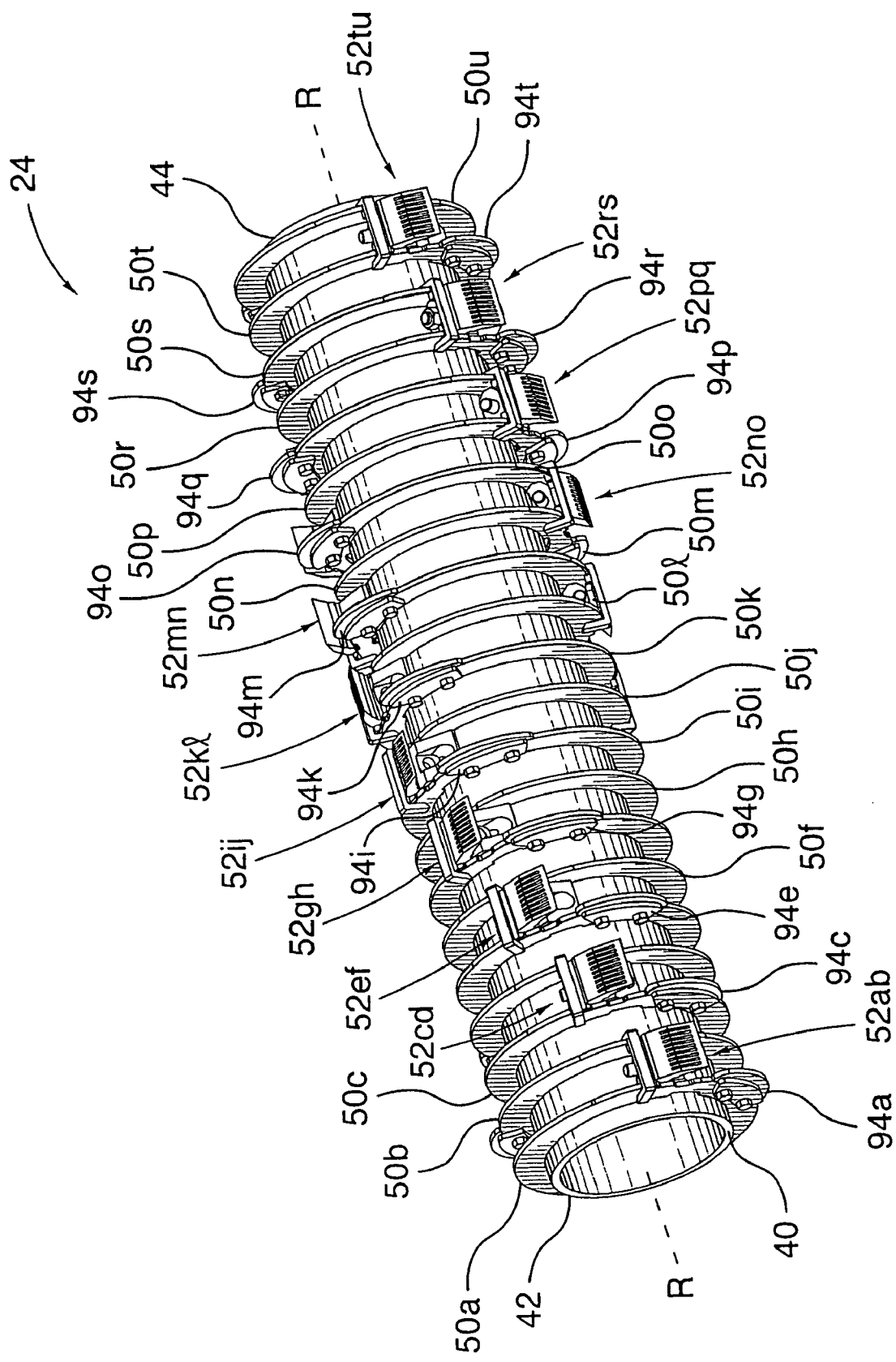
FIG. 2*a* is a front left perspective view of the brush cutting head shown in FIG. 1.
Figure 2B:
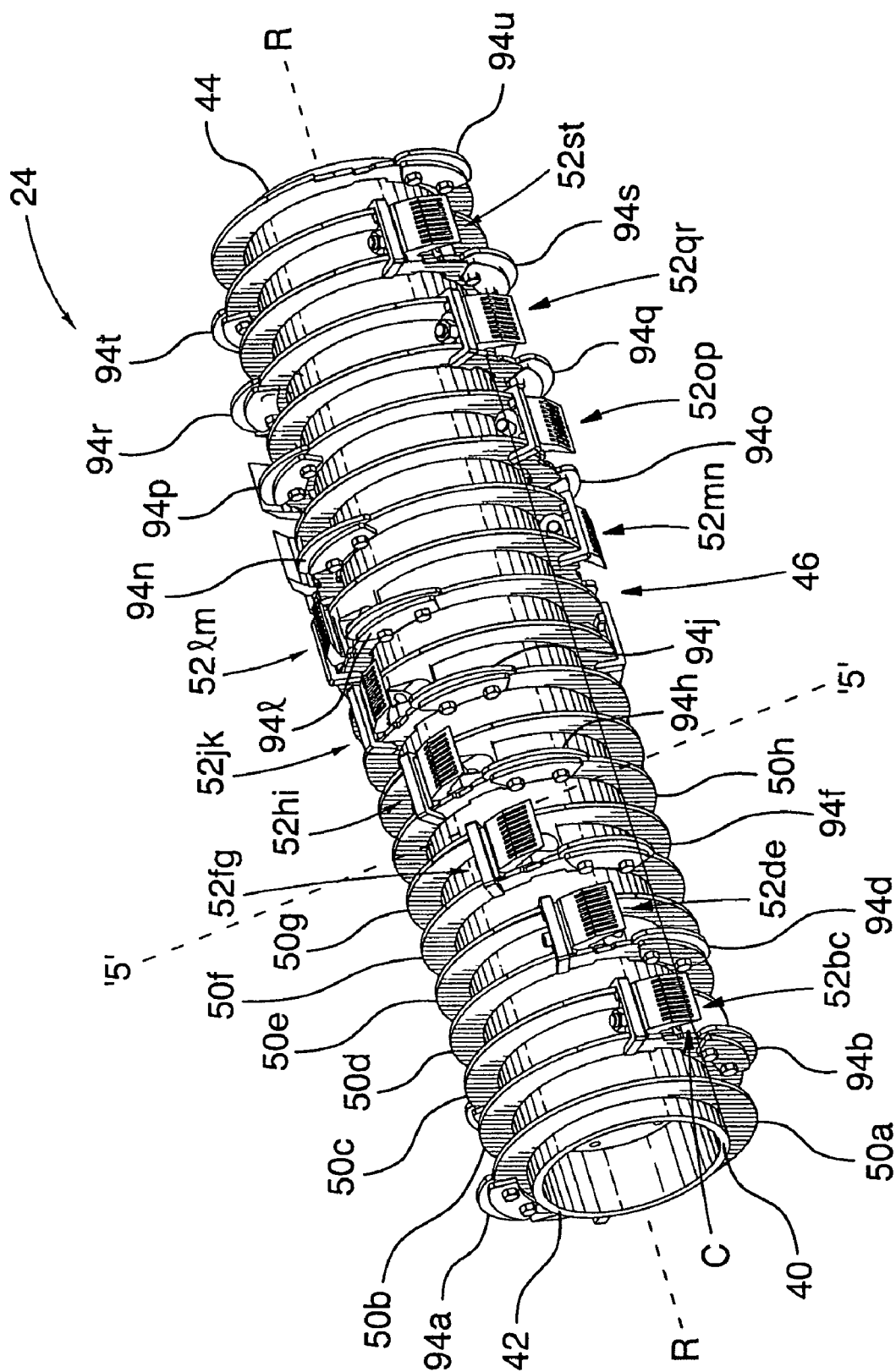
FIG. 2*b* is another perspective view similar to that shown in FIG. 2*a* showing the brush cutting head rotated 180 degrees.
Figure 3:
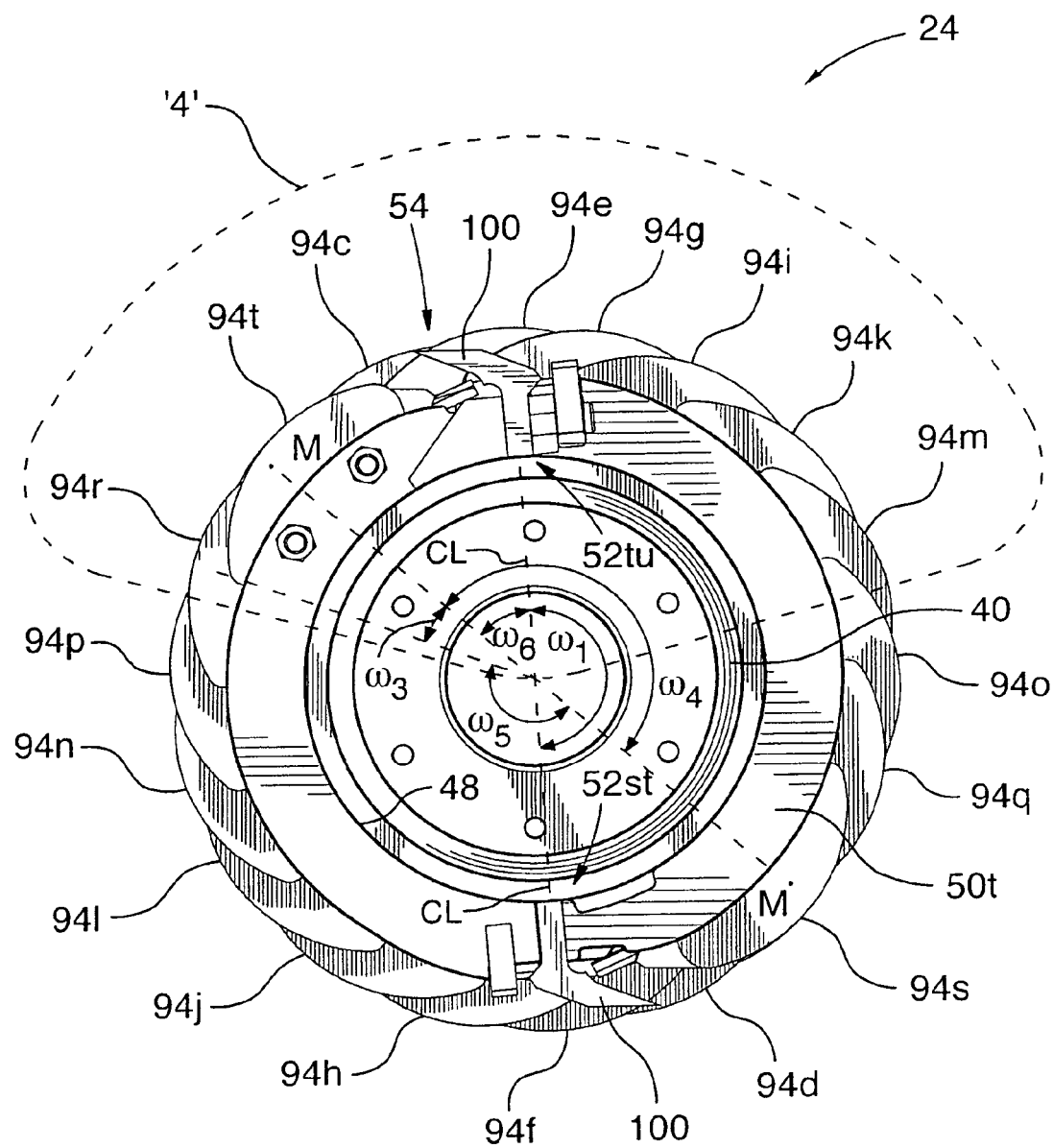
FIG. 3 is an end view of the brush cutting head shown in FIG. 2*a* taken from the opposite end, rotated 90 degrees and with a collar removed therefrom for the sake of clarity.

Referring now to FIG. 2a, 2b and 3, there is shown the brush cutting head 24. The brush cutting head 24 includes a tubular support body 40 that has a first end 42, an opposed second end 44 and an intermediate portion 46 extending between the first and second ends 42 and 44. In this embodiment, the support body 40 is cylindrical. This, however, need not be the case in every application. In alternative embodiments, the support body may be shaped differently.

The intermediate portion 46 has a curved outer surface 48 (shown in FIG. 4) that defines the circular cross-section of the support body 40. Concentrically mounted to the support body 40 at spaced intervals along the intermediate portion 46, is a plurality of protective collars designated with reference numerals 50a through to 50u (collectively, "collars 50"). As will be explained in greater detail below, pairs of adjacent collars 50 cooperate with each other to define mounting sites or stations 52 for each receiving a cutting tooth assembly 54 therein.

Figure 8:
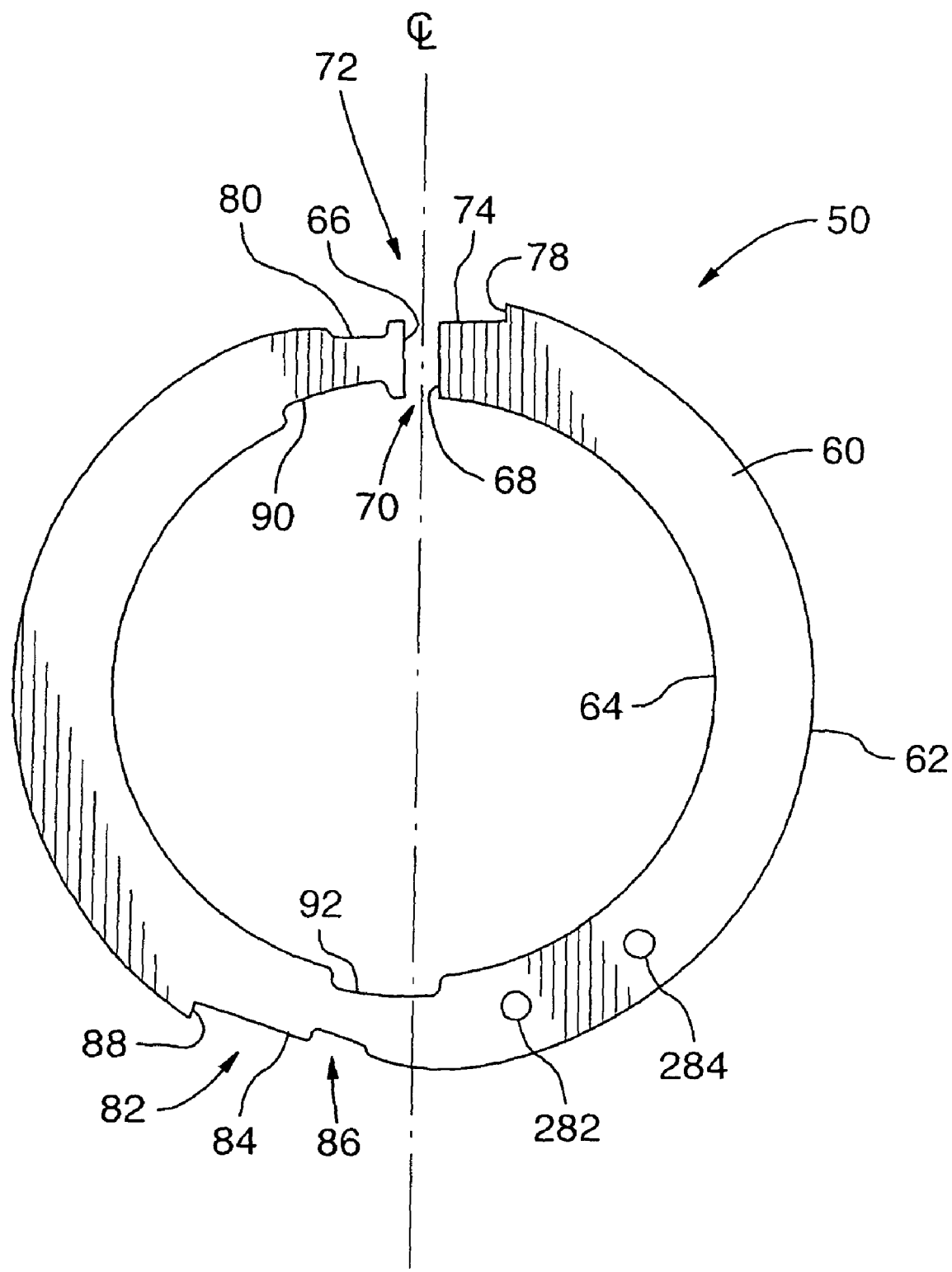
FIG. 8 is a side elevation view of one of the collars shown in FIG. 6.
Figure 9:
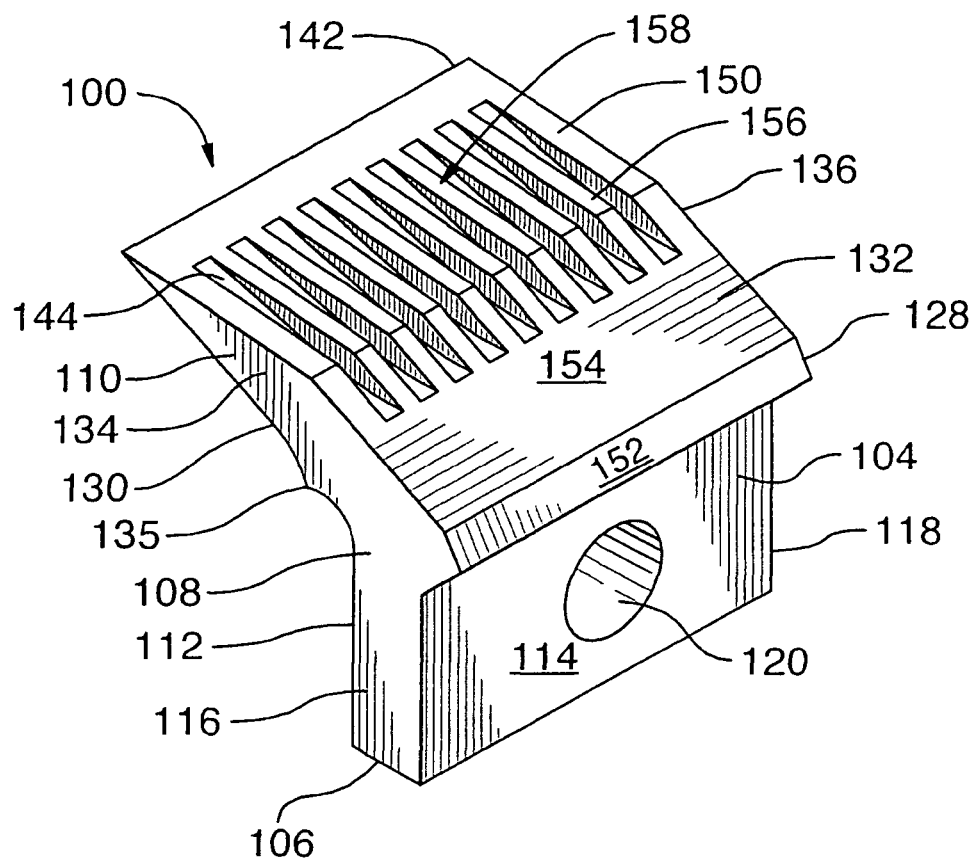
FIG. 9 is a perspective view of one of the cutting teeth shown in FIG. 6.

Referring to FIG. 8, each collar 50 is has a substantially penannular structure defined by a relatively flat, circumferentially extending, sidewall 60. The sidewall 60 is bounded circumferentially by an outer edge 62 and inner edge 64, and has first and second spaced apart ends 66 and 68. The space between the ends 66 and 68 defines a cutout 70 formed in the collar 50. The cutout 70 is disposed slightly off centre of the centreline CL of the collar 50.

At second sidewall end 68, the outer edge 62 has been trimmed back (by laser cutting) at a first location 72 to define a first substantially planar edge 74. A short distance away from the second sidewall end 68, the edge 74 terminates at a relatively small shoulder 78 defined in the outer edge 62. Inwardly of the first end 66 (i.e. moving counterclockwise), there is a rebate 80 that has been formed by a cut away in the outer edge 62. The outer edge 62 has also been trimmed at a second location 82 circumferentially spaced from the first location 72, to define a second substantially planar edge 84 and rebate 86. The edge 84 also terminates at a shoulder 88 of a size similar to that of shoulder 78. The rebates 80 and 86 are provided to facilitate the removal of bits of wood or debris that may be lodged within the cutting assembly 54.

Adjacent each of the first and second locations 72 and 82, the inner edge 64 of the sidewall 60 has a generally channel-shaped rebate 90, 92 (as the case may be) defined therein. The first rebate 90 is circumferentially spaced from the second rebate 92. The rebates 90 and 92 provide access to the space between adjacent collars 54 thereby facilitating the welding of a portion of the cutting tooth assembly 54 to the collar sidewalls 60. Proximate the second rebate 92, the collar 50 has defined therethrough a pair of bores 282 and 284 to permit fixation of a protective guard member 94 for the cutting tooth assembly 54.

The collars 50 are radially mounted to the support body 40 with their inner sidewall edges 64 welded to the curved surface 48. The spacing between adjacent collars 50 is sized to correspond generally to the width of the cutting tooth assembly 54 and tends to minimize the risk that the cutting tooth assembly 54 will be damaged by a rock. As explained in greater detail below, to further protect or shield the cutting tooth assemblies from violent impact with large rocks or the like, the collars 50 each carry thereon the protective guard member 94.

Figure 6:
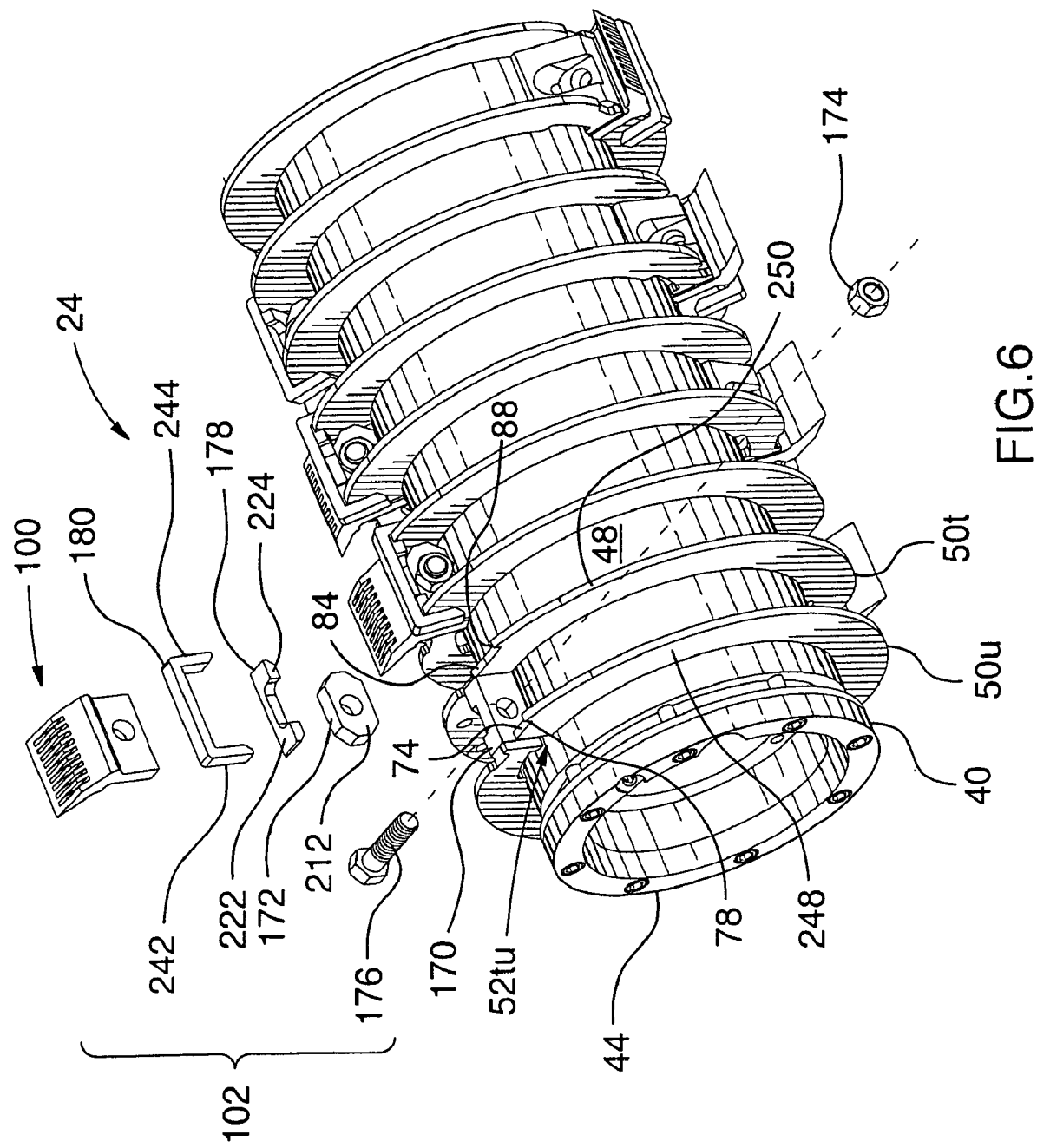
FIG. 6 is an enlarged perspective view of the brush cutting head of FIG. 2*a* taken from the opposite end and rotated 270 degrees, showing a representative cutting tooth and a portion of its corresponding mounting assembly exploded, and the protective cutting tooth guard members removed.

Each collar 50 is radially offset from its adjacent collar 50 such that the cutouts 70 of adjacent collars are staggered relative to each other. In this embodiment, each station 52 is defined between the cutout 70 formed in a given collar 50 and that portion of the sidewall 60 of the adjacent collar 50 that is disposed opposite the cutout 70. Referring to FIG. 6, the station 52tu (previously identified generically as "station 52") can be seen to be defined between the cutout 70 in collar 50tu and the portion of sidewall 60 of collar 50t located opposite the first cutout 70. Each of the other stations 50, identified in FIG. 2a is similarly defined between the cutout 70 of one collar 50 and a portion of sidewall 60 of an adjacent collar 50. As best shown in FIG. 3, the station 52tu is circumferentially staggered from the station 52st by an angle $\omega_1$. In this embodiment, the angle $\omega_1$ measures approximately 180 degrees.

Due to this stagger and the geometry of the collars 50, every alternate station 52 is also radially offset from its respective reference station by an angle $\omega_2$. Taking as an example stations 52tu and 52rs, it can be seen in FIG. 4 that station 52rs is circumferentially staggered relative to station 52tu by an angle $\omega_2$. Preferably, the angle $\omega_2$ is an acute angle. In this embodiment, the angle $\omega_2$ measures approximately 20 degrees.

In this embodiment, the staggered arrangement of the collars 50 allows the plurality of cutting tooth assemblies 54 to be disposed along the support body 40 in a generally double helix pattern thereby permitting cutting across the entire length of the support body 40 when the brush cutting head 24 is rotated about its longitudinal axis 'R-R'. As shown in FIGS. 2a and 2b, the cutting tooth assemblies 54 mounted in alternate stations 52ab, 52cd, 52ef, 52gh, 52ij, 52kl, 52mn, 52op, 52qr, and 52st define a first helical layout, whereas the cutting tooth assemblies 54 mounted in the remaining alternate stations 52bc, 52de, 52fg, 52hi, 52jk, 52lm, 52no, 52pq, 52rs and 52tu define a second helical layout. While this double helix pattern is generally preferred, it will be appreciated that the cutting tooth assemblies 54 could be laid out differently along the support body 40. More specifically, the angles $\omega_1$ and $\omega_2$ could be varied to achieve a particular distribution or arrangement of cutting tooth assemblies 54 on the support body 40. For instance, the cutting tooth assemblies could be disposed in a triple or quadruple helix arrangement.

The cutting tooth assembly 54 is now described in greater detail with reference to FIGS. 2a, 3 and 9 to 14. The cutting tooth assembly 54 includes a cutting tooth 100 and a mounting assembly 102 for securely fixing the cutting tooth 100 within a respective station 50. The cutting tooth 100 has a base portion 104 having a first end 106 and a second end 108, and a cutting portion 110 mounted to the second end 108 of the base portion 104.

The base portion 104 has a generally planar, leading face 112, an opposing trailing face 114 and two, spaced apart, lateral faces 116 and 118. Defined in the base portion 104 is a bore 120 that extends between the leading face 112 and the trailing face 114. The bore 120 is adapted to receive a fastener therethrough to permit fastening of the cutting tooth 100 to the mounting assembly 102. Adjacent the second end 108, the trailing face 114 of the base portion 104 flares outwardly to partially define a wedge-shaped abutment shoulder 128. The abutment shoulder 128 serves to reinforce the cutting tooth 100 and enables it to better resist the high impact forces to which it may be subjected during operation of the brush cutting head 24. As a result, the cutting tooth 100 tends to be less vulnerable to cracking failures along the area where the cutting portion 110 meets the base portion 104. As will be explained in greater detail below, when the cutting tooth 100 is mounted within its respective station 52, the abutment shoulder 128 will rest on a portion of the mounting assembly 102.

Figure 10:
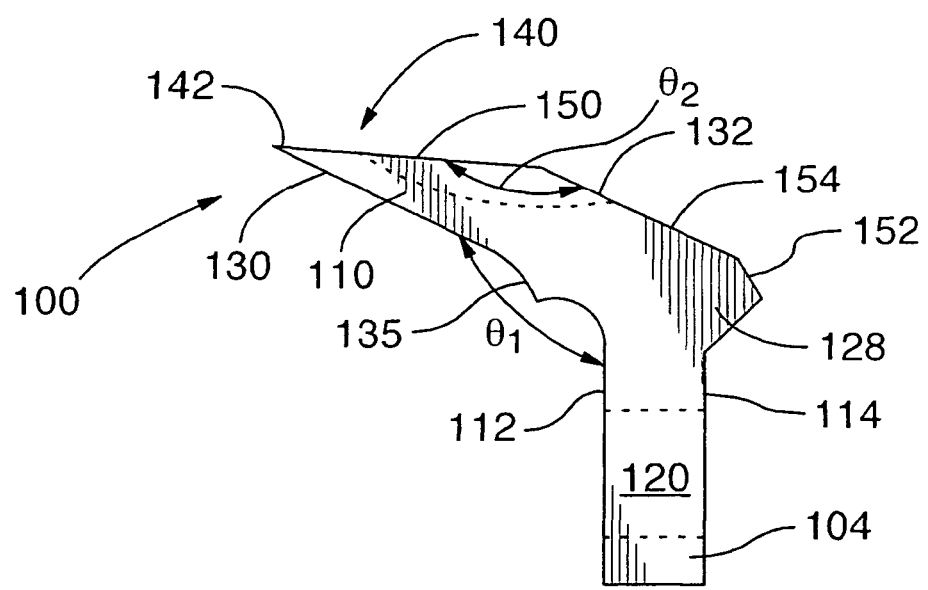
FIG. 10 is a side elevation view of the cutting tooth shown in FIG. 9.

The cutting portion 110 is carried on the second end 108 of the base portion 104 in a generally, forwardly leaning or canted fashion, and is integrally formed with the base portion 104. The cutting portion 110 has a leading face 130, an opposed trailing face 132 and two spaced-apart lateral faces 134 and 136. The leading face 130 of the cutting portion 110 joins the leading face 112 of the base portion 104 while the trailing face 132 joins the trailing face 114. Adjacent the juncture of the leading face 130 and the leading face 112, a spur 134 projects from the leading face 130. The spur 134 is provided for further chipping cutting debris. As best shown in FIG. 10, an external obtuse angle $\theta_1$ is formed between the leading face 130 and the leading face 112. In this embodiment, the angle $\theta_1$ measures approximately 116 degrees.

The leading and trailing faces 130 and 132 cooperate with each other to define a tapering, wedge-like, profile 140 that terminates in a cutting edge 142. The cutting edge 142 is carried forwardly of the leading face 112 of the base portion 104 such that it tends to be the first element of cutting tooth 100 to make contact with the brush. The cutting edge 142 extends generally linearly between the lateral faces 134 and 136 and substantially parallel to the rotational axis R-R of the brush cutting head 24. However, in alternative embodiments, the cutting edge could be configured differently. For instance, the cutting edge could be configured to extend generally diagonally between the lateral faces 134 and 136, askew of the rotational axis R-R. This configuration would tend to favor one end of the cutting edge over the other contacting the brush. In a further alternative, the cutting edge could be scalloped or formed to extend in a generally, zigzagging fashion.

When the cutting tooth 100 is mounted within the station 52, the cutting edge 142 extends beyond the first and second edges 74 and 84 of the sidewall 60 (of adjacent collars 50) to facilitate the cutting action of the tooth. The reduced profile of the sidewall 60 at the edges 74 and 84 tends to facilitate evacuation of the cutting debris away from the station 52 and the cutting tooth 100. In operation, the cutting edge 142 of each cutting tooth 100 comes into contact with the brush thereby creating debris as a result of the cutting action of the cutting tooth 100. As the debris passes over the cutting edge 142, it abrades the surface of the cutting edge 142 thereby sharpening the cutting tooth 100. This sharpening action tends to maintain or enhance the cutting efficiency of the cutting tooth and tends to reduce the need for mechanical sharpening. Thereafter the debris travels along the channels 144 to be carried away from cutting edge 142.

Returning to FIG. 10, the trailing face 132 of the cutting portion 110 has an upper portion 150, a lower portion 152 and an intermediate portion 154 disposed between the upper portion 150 and lower portion 152. The upper portion 150 extends between the cutting edge 142 and the intermediate portion 154. The upper portion 150 is bent relative to the intermediate portion 154 such that an internal obtuse angle $\theta_2$ is defined therebetween. In the present embodiment, the angle $\theta_2$ measures approximately 158.5 degrees. Similarly, the lower portion 152, which partially defines the abutment shoulder 128, is also canted relative to the intermediate portion 154.

The cutting portion trailing face 132 has a plurality of knuckle-like protuberances in the nature of ridges 156 formed thereon. The ridges 156 are generally evenly spaced and extend generally transverse of the cutting edge 142 between the upper and intermediate portions 150 and 154 of the trailing face 132. Defined between each pair of adjacent ridges 156 is a channel or groove 144 which when viewed from the side (as shown in FIG. 10) is generally curved. The alternate arrangement of ridges 156 and channels 144 define corrugations 158 on the trailing face 132. These corrugations serve to direct rocks, wood chips and other debris away from the cutting edge 142 thereby minimizing dispersion of the debris over the cutting area. In addition, the ridges 156 can themselves define additional cutting edges for improved cutting performance.

In this embodiment, the grooves 144 are machine ground into the trailing face 132 during fabrication. However, it should be appreciated that in alternative embodiments, the cutting portion 110 could be cast or forged in such a way that grooves and ridges are formed.

While in this embodiment, the corrugations 158 have a generally crenellated profile when view in cross-section, it will be appreciated that this need not be the case in all applications. In alternative embodiments, the corrugations could be configured differently. For instance, the corrugations could have a generally arcuate or zigzag profile when viewed in cross-section. Other profiles may also be employed to similar advantage.

While it is preferred that the brush cutting head 24 be used with cutting teeth 100, it will be appreciated that other types of teeth could also be used to similar advantage. More specifically, it may be advantageous to change the cutting tooth to adapt to the nature of the materials likely to be encountered during cutting operations. For instance, where the terrain to be cleared is rocky, the cutting tooth 100 described above could be replaced with a hammer-type tooth which tends to be better suited to resisting frequent impacts with rocks and the like.

Referring to FIGS. 6 and 11 to 14, the mounting assembly 102 includes a mounting block 170 disposed forwardly of the cutting tooth 100, a mounting plate 172 disposed rearwardly of the cutting tooth 100, a fastener in the nature of a nut 174 and bolt 176, an abutment plate 178 for placement on the substantially planar edges 74 and 84, and a C-shaped retaining member 180.

Figure 11:
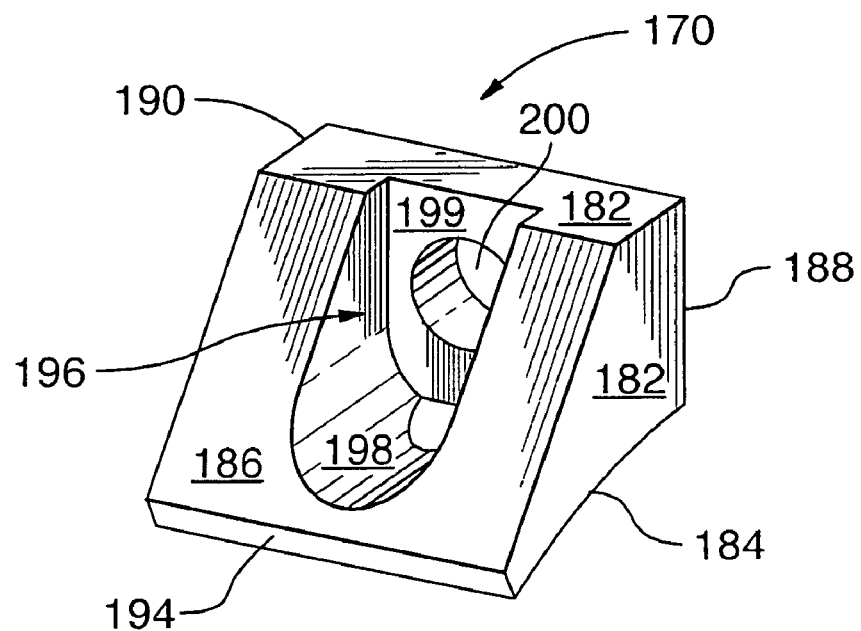
FIG. 11 is a perspective view of the mounting block shown in FIG. 6.

Referring to FIG. 11, the mounting block 170 is defined by a top face 182, a bottom face 184 disposed opposite the top face 182, leading and trailing faces 186 and 188 which extend between the top and bottom faces 182 and 184 and a pair of spaced apart lateral faces 190, 192. The bottom face 184 is generally arcuate—its radius of curvature matching that of the curved surface to thereby facilitate welding of the mounting block 170 to the support body 48. The trailing face 188 extends generally upwardly from the bottom face 184 to join the top face 182. As compared to the bottom face 184, the top face 182 is relatively short. The leading face 186 extends away from the top face 182 at a downward angle toward the bottom face 184. A narrow band 194 joins the leading face 186 to the bottom face 184. The leading face 186, the narrow band 194 and the bottom face 184 cooperate with each other to impart to the mounting block 170 a generally tapering (wedge-like) profile. It will be appreciated that the configuration of the mounting block 170 with its sloped leading face 186 tends to encourage the deflection of debris away from the cutting tooth 100.

Formed centrally in the leading face 186 and extending partially into the top face 182, is a relatively large rebate 196. The rebate 196 defines a generally curved bottom wall 198 and a leading wall 200 that is generally parallel to and spaced apart from the trailing face 188. The rebate 196 communicates with a bore 200 that extends between the trailing face 188 and the leading face 186. The rebate 196 and the bore 200 are sized to accommodate the bolt 176 extending therethrough.

Figure 12:
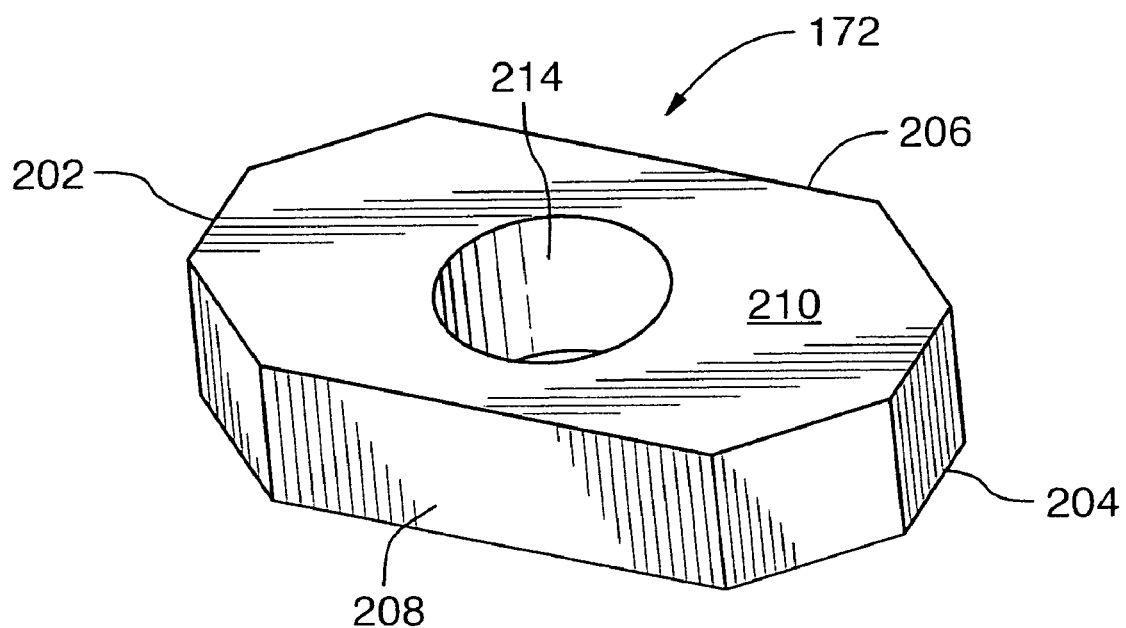
FIG. 12 is a perspective view of the mounting plate shown in FIG. 6.

With reference to FIG. 12, the mounting plate 172 is now described in greater detail. The mounting plate 172 is a generally rectangular plate with truncated corners, its shape defined primarily by a pair of opposed, relatively short, sides 202 and 204 and a pair of opposed, relatively long sides 206 and 208 that extend between the short sides 202 and 204. Moreover, the mounting plate 172 has a leading face 210, an opposed trailing face 212 and an aperture 214 defined therein between the leading and trailing faces 210 and 212. The aperture 214 is adapted to receive the bolt 176 therethrough.

Figure 13:
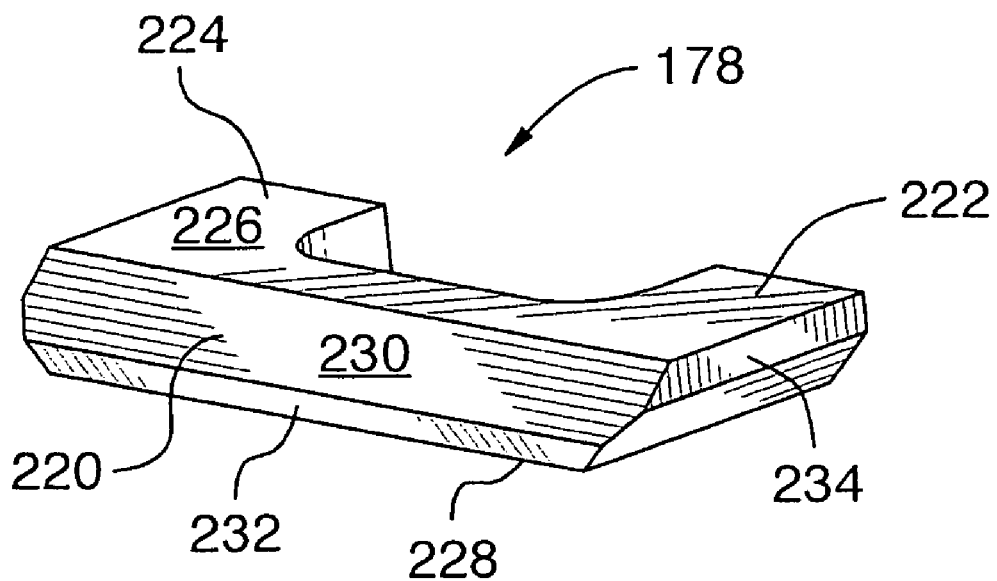
FIG. 13 is a perspective view of the abutment plate shown in FIG. 6.

Referring now to FIG. 13, there is shown the abutment plate 178. Abutment plate 178 is generally C-shaped when viewed in top plan. It has a back portion 220 and a pair of spaced apart arm portions 222 and 224 joined to the back portion 220 and extending away therefrom. The abutment plate 178 further includes a top face 226, an opposed bottom face 228 and a leading face 230 spanning the back portion 220. The leading face 230 extends downwardly from the top face 226 toward the bottom face 228. A narrow band 232 joins the leading face 230 to the bottom face 228. The leading face 230, the narrow band 232 and the bottom face 228 cooperate with each other to impart to the abutment plate 178 a generally tapering (wedge-like) profile. A portion of the outer-facing side 234 of each arm portions 222, 224 is also trimmed inwardly starting at a point roughly one third of the way from the top face 226 and terminating at the bottom face 228.

Figure 14:
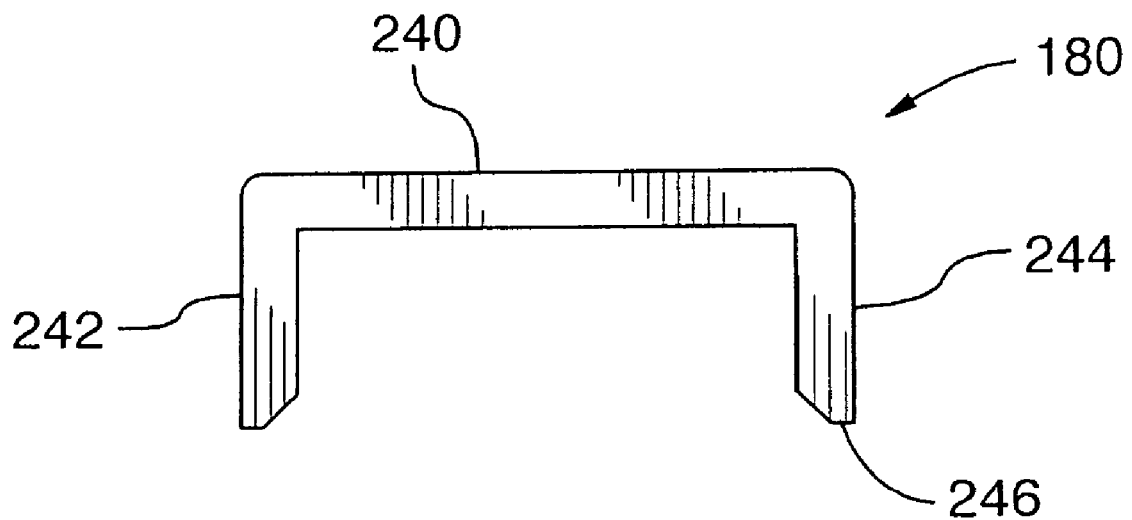
FIG. 14 is an end elevation view of the retaining member shown in FIG. 6.

With reference to FIG. 14, the retaining member 180 has a back portion 240 and a pair of spaced apart arm portions 242 and 244, each depending from one end of the back portion 240. To facilitate welding of the arm portions 242 and 244 to the collars 50, the terminal end 246 of each arm portion 242, 244 is trimmed on an angle. The spacing between the arm portions 242 and 244 is sized so that the retaining member 180 can span the distance between two adjacent collars 50, with one arm portion 242 abutting the first face 248 of one collar 50 and the other arm portion 244 abutting the second face 250 of another adjacent collar 50.

As best shown in FIG. 6, during fabrication of the brush cutting head 24, the mounting block 170 and the abutment plate 178 are fixed to adjacent collars 50*u* and 50*t* (as the case may be). More specifically, the mounting block 170 is positioned between adjacent collars 50*u* and 50*t* with its bottom face 184 abutting the curved surface of the support body 40 and its trailing face 188 disposed flush with the sidewall end of collar 50*u* so as to allow unobstructed access to the cutout during re-tooling. The mounting block 170 is then welded to the adjacent collars 50 about the first and second rebates 90 and 92. The abutment plate 178 is mounted to span the space between adjacent collars 50*u* and 50*t*. The first arm portion 222 of the abutment plate 178 is supported on the first substantially planar edge 74, while the second arm portion 224 rests on the second substantially planar edge 84. At their terminal extremities the arm portions 222 and 224 abut the shoulders 78 and 88 defined on the outer edges of the collars 50*u* and 50*t*. Thus disposed, the abutment plate 178 is welded in place.

Figure 4:
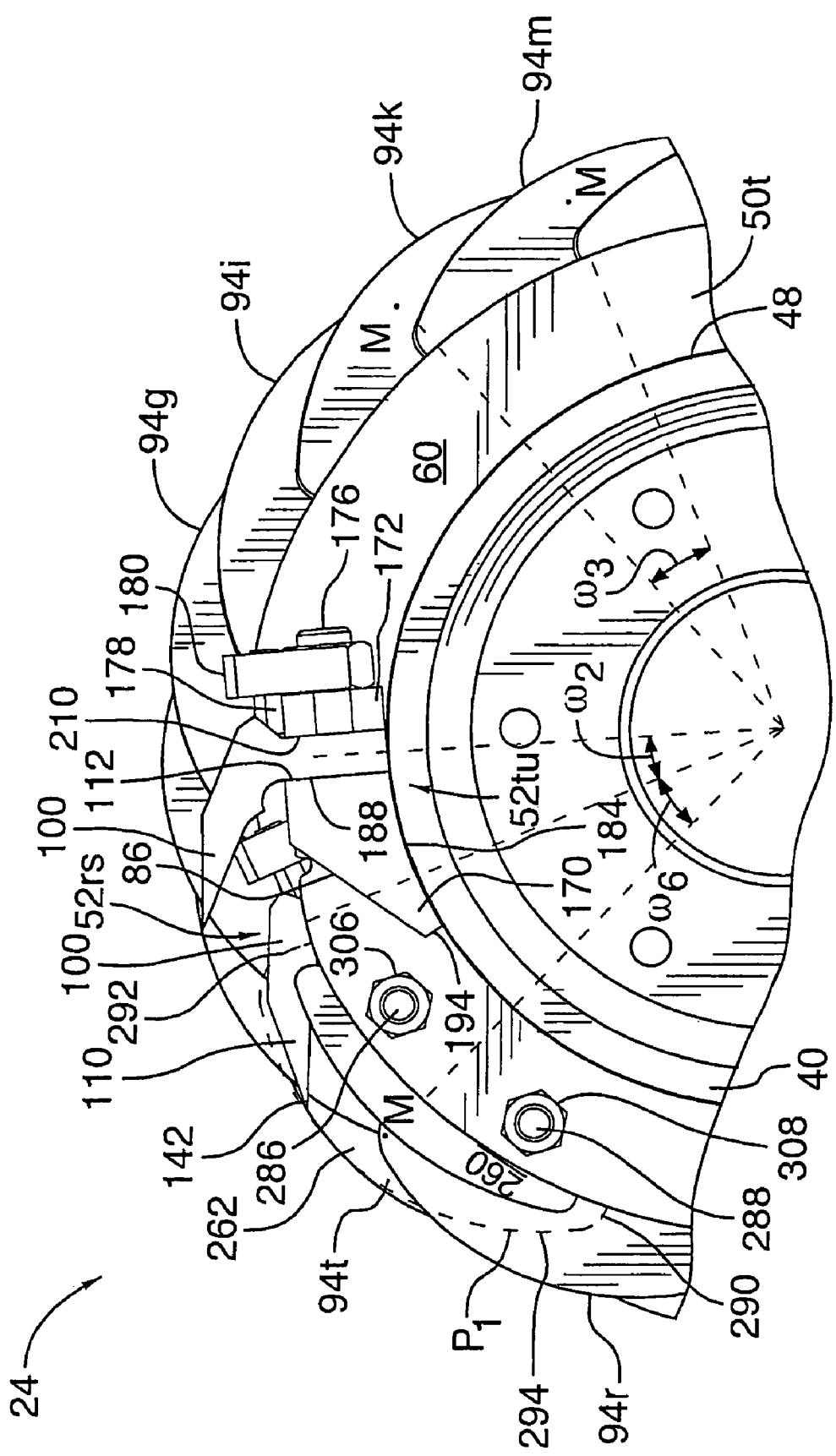
FIG. 4 is an enlarged view similar to that illustrated in FIG. 3 showing the encircled portion '4'.

Referring now to FIGS. 4 and 6, the attachment of the cutting tooth 100 to the brush cutting head 24 is now described in greater detail in the context of station 52*tu*. The cutting tooth base portion 104 is placed between the mounting block 170 and the abutment plate 178 with its leading face 186 abutting the trailing face 188 of the mounting block 170 and its abutment shoulder 128 bearing on the leading face 130 of the abutment plate 178. The mounting plate 172 is then placed between the collars 50*u* and 50*t* with its long side 206 abutting the curved surface 48 and its opposed long side 206 abutting the bottom of the abutment plate 178. Thereafter, the bolt 176 is inserted into the aligned apertures of the mounting block 170, the cutting tooth 100 and the mounting plate 172 and securely fastened with the nut 174. The space between the arm portions 222 and 224 facilitates the use of a tool to tighten or loosen (as the case may be) the nut 174.

As best shown in FIGS. 2a and 2b, the brush cutting head 24 is provided with a plurality of protective guard members 94 designated with reference numerals 94a through to 94u (collectively, "guard members 94"). In preferred embodiment, the guard member 94 is fabricated from two steel plates that are welded to each other—a first plate 260 attachable to a collar 50 and a second plate 262. In other embodiments, the guard member may be cast or machined from a single piece of hardened steel. In further alternative embodiments, the first and second plates may designed so as to be releasably attachable to each other using fasteners or the like.

Figure 16:
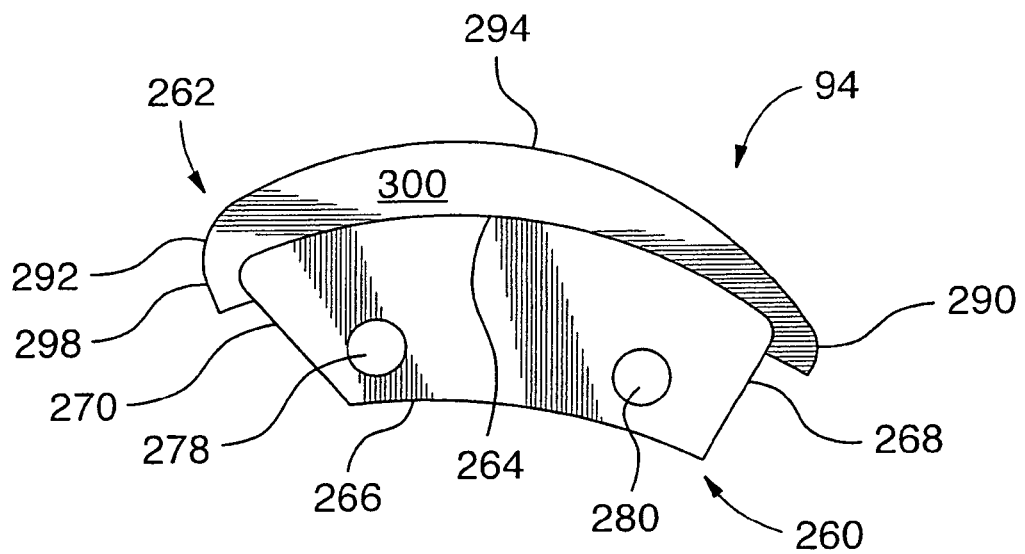
FIG. 16 is a side elevation view of the guard member shown in FIG. 15.

The margins of the first plate 260 are defined by a first arcuate edge 264, an opposed second arcuate edge 266 and two lateral edges 268 and 270 that extend between the first and second edges 264 and 266. As best shown in FIG. 16, the lateral edge 268 forms substantially a right angle with both the first and second arcuate edges 264 and 266. At the juncture of the second arcuate edge 266 and the lateral edge 270, the first plate 260 has been trimmed back such that the lateral edge 270 forms an acute angle with the first arcuate edge 264 and correspondingly, an obtuse angle with the second arcuate edge 266.

The first plate 260 also has an outer face 272 and an opposed inner face 274. The inner face abuts the face 276 of collar 50 when the guard member 94 is mounted to the collar 50. Adjacent the second arcuate edge 266 is a pair of spaced apart bores 278 and 280 that are machined to extend through the outer and inner faces 272 and 274 of the first plate 260. The bores 278 and 280 are alignable with corresponding bores 282 and 284 formed in the collar 50, thus permitting fasteners in the nature of bolts 286 and 288 to be received therethrough in order to fix the guard member 94 to the collar 50.

The second plate 262 includes a first leading end 290 and a second trailing end 292. The midpoint between the first leading end 290 and the second trailing end 292 defines the midpoint M of the protective guard member 94. The second plate 262 has a relatively crescent-shaped profile $P_1$ (shown in dashed lines in FIG. 4 on a representative guard member-guard member 94t). The crescent-shaped profile $P_1$ is defined by a first convex edge 294 and an opposed second concave edge 296 extending between the leading and trailing ends 290 and 292. The crescent-shaped profile $P_1$ and in particular, the curve of the first convex edge 294, tend to reduce friction between the guard member 94 and material encountered during the brush cutting operation. Additionally, as explained in greater detail below, the profile $P_1$ defines a protective envelope at least partially encompassing the cutting tooth 100.

It should also be recognized that the profile of the second plate 262 need not be crescent-shaped in every embodiment. Other profiles could also be successfully employed.

The second concave edge 296 is shaped to conform substantially to the curved profile of the outer edge 62 of the collar 50. At the first leading end 290, the second plate 262 tapers where the first convex edge 294 meets the second concave edge 296. As will be appreciated, the taper serves a friction/resistance reducing function. There is no such taper at the second trailing end 292. The second plate 262 being fuller at this extremity, it terminates with a relatively large, bullnose tip 298 to provide increased protective coverage for the cutting tooth 100.

To increase the guard member's wear, abrasion and impact resistance and service life, the surface of the second portion along the first convex edge 294 has been subjected or exposed to a hardfacing treatment of the type generally known in the art.

In like fashion to the first plate 260, the second plate 262 also has two opposed faces 300 and 302. The inner face 274 of the first plate 260 is welded to the face 300 of the second plate 262 along a portion that is located closer to the second concave edge 296 than to the first convex edge 294. The thickness of the second plate 262 as measured between the faces 300 and 302 matches or at least corresponds substantially to, the thickness of the collar 50 as measured between its opposite faces.

Figure 17:
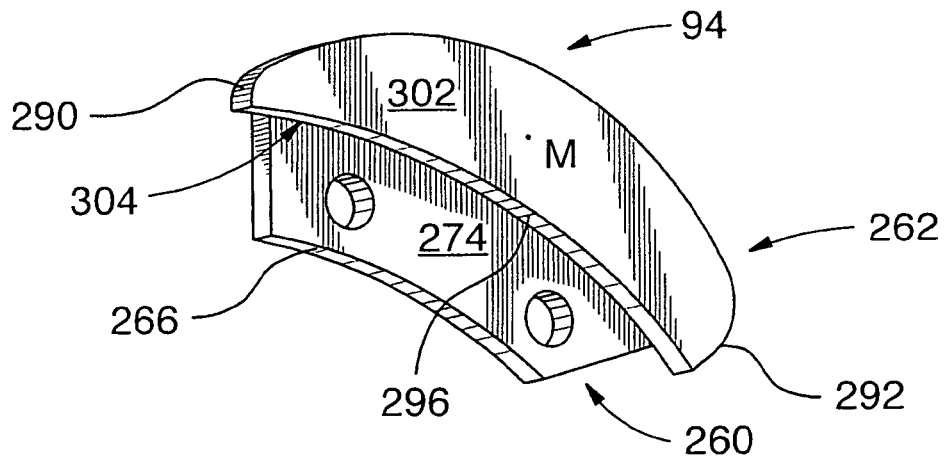
FIG. 17 is a bottom right perspective view of the guard member shown in FIG. 15.
Figure 13:
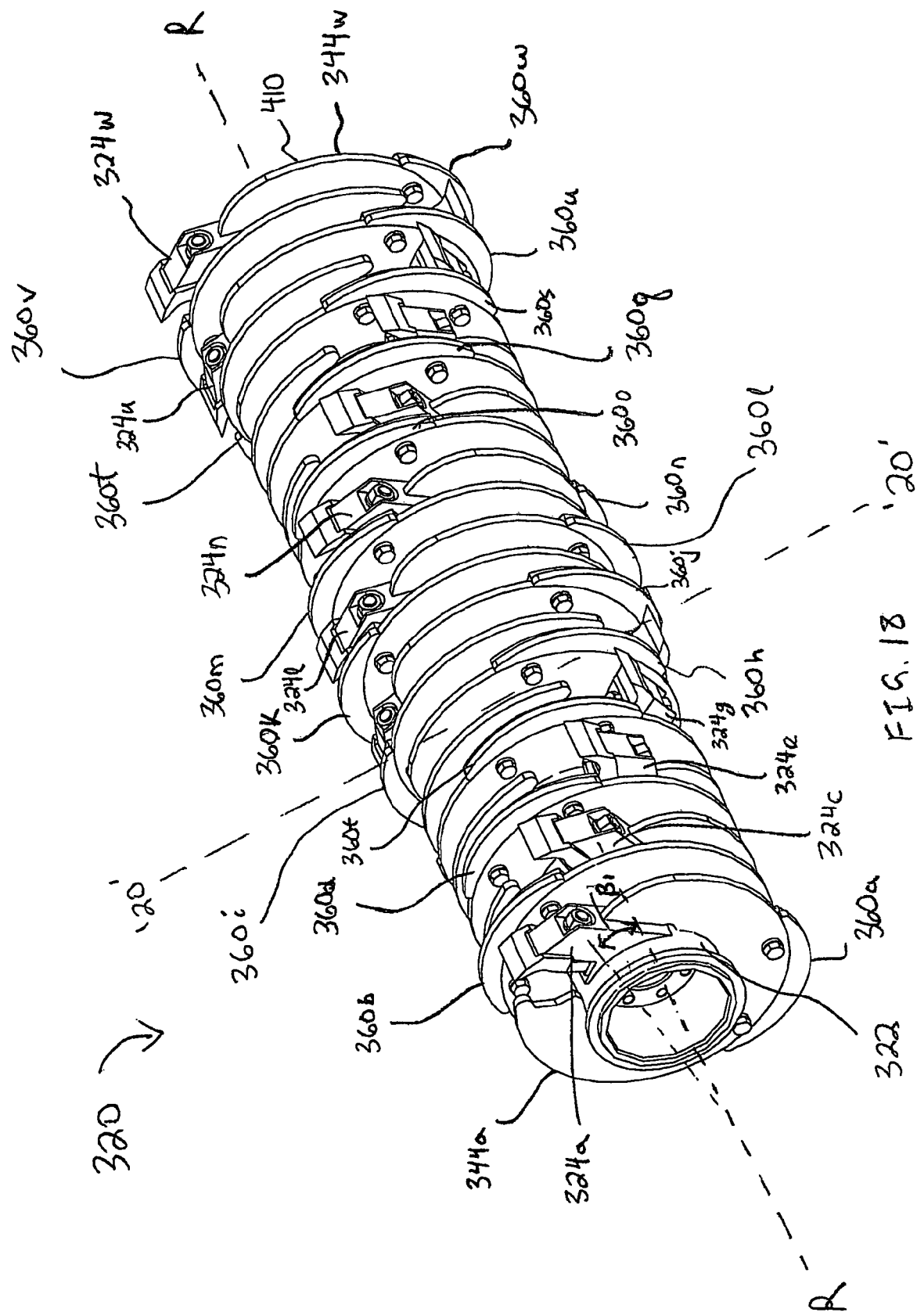

As best shown in FIG. 17, the second concave edge 296 of the second plate 262 and the inner face 274 of the first plate 260 define a shoulder 304 that is adapted to abut the outer edge 62 and the face 276 of the collar 50 when the guard member 94 is mounted to the collar 50. The shoulder 304 tends to facilitate placement of the protective guard member 94 on the collar 50 prior to fastening. Additionally, the provision of the shoulder 304 tends to allow the forces acting on the guard member 94 to be better distributed within the guard member and transferred to the collar 50. In this way, a reduction in the shearing forces acting through the bolts 286 and 288 may be achieved thereby mitigating the risk that the guard member may become detached from the collar as a result of the fasteners having failed in shear.

Figure 7:
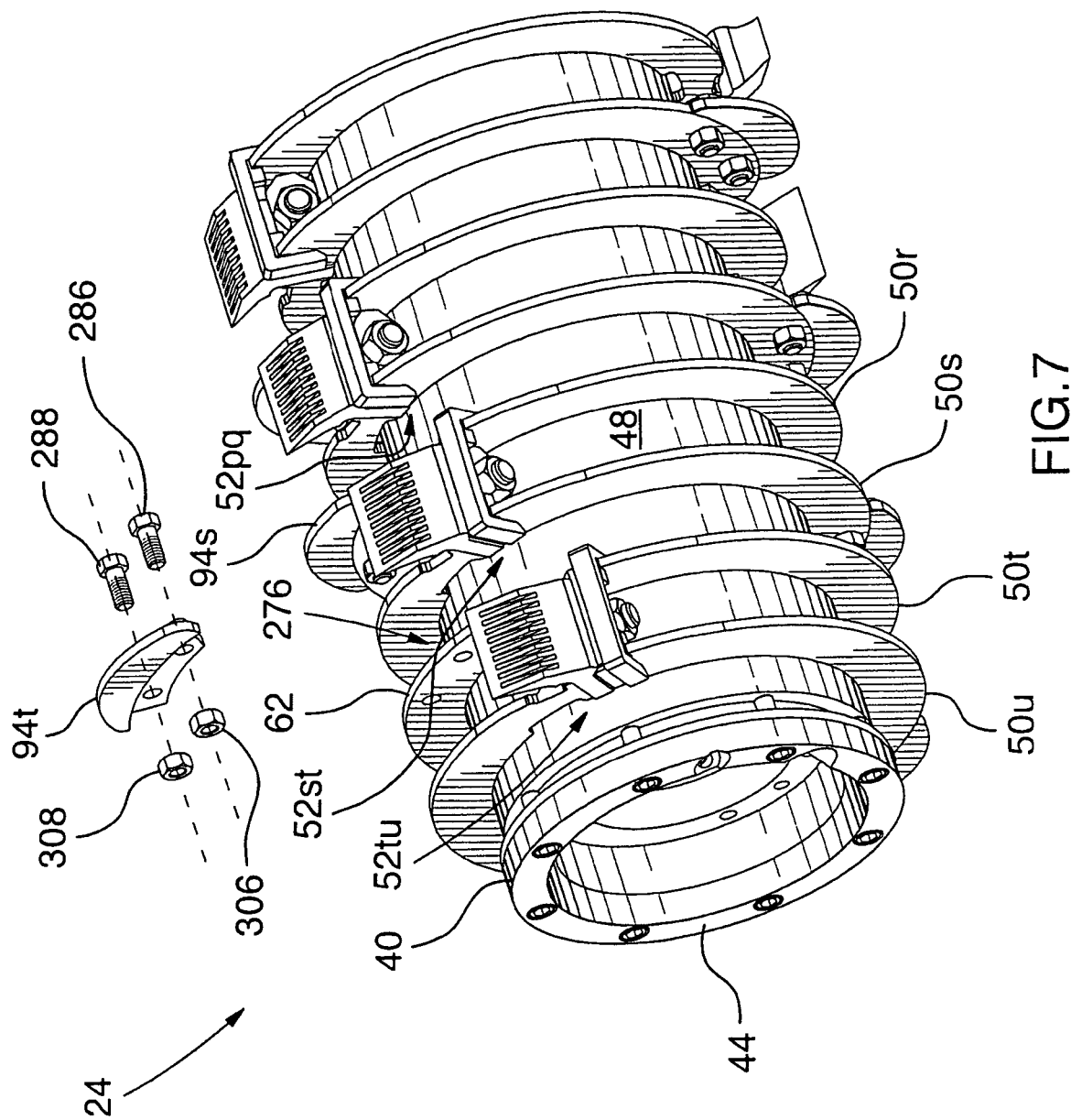
FIG. 7 is an enlarged perspective view similar to that illustrated in FIG. 6 showing the cutting teeth mounted on the brush cutting head, and a representative cutting tooth guard member and its fasteners exploded.

Referring now to FIG. 7, the attachment of a representative guard member 94t to its associated collar 50t is now described. The guard member 94s is placed onto the collar 50s such that the shoulder 304 abuts the outer edge 62 and the face 276 of the collar 50t. The bores 278 and 280 in the first plate 260 are aligned with the bores 282 and 284 defined in the collar 50t. Thereafter, the bolts 286 and 288 are introduced through the aligned bores 278, 282 and 280, 284, respectively, and securely fastened with nuts 306, 308. It will thus be appreciated that attachment of the guard members 94 to the collars 50 tends to be a simple task that may be performed relatively, quickly and easily, thereby minimizing the down time required for tooling/servicing of the brush cutting head 24 and enhancing productivity.

In this exemplary embodiment, the cutting tooth assemblies 54 are mounted onto the brush cutting head 24 prior to the attachment of the guard members 94 onto the collars 50. This need not be the case in every application. In other embodiments, the sequence of assembly may be performed in reverse order with the guard members 94 being installed first followed by the mounting of the cutting tooth assemblies 54.

It will be apparent to one skilled in the art that, in this embodiment, the first plate 260 serves two functions. Its primary purpose is to attach the second plate 262 to the collar 50. But to a certain extent, it also functions as a reinforcement member for the second plate 262, and the protective guard 94 as a whole allowing them to better withstand repeated impacts with rocks and other hard objects. While this arrangement is generally preferred, it should be noted that in alternative embodiments, the protective guard member could be designed without a first plate portion. In one such an embodiment, the first plate could, in effect, be incorporated into a larger, generally planar, second plate. This modified second plate could be affixed directly to the collar.

Figure 5:
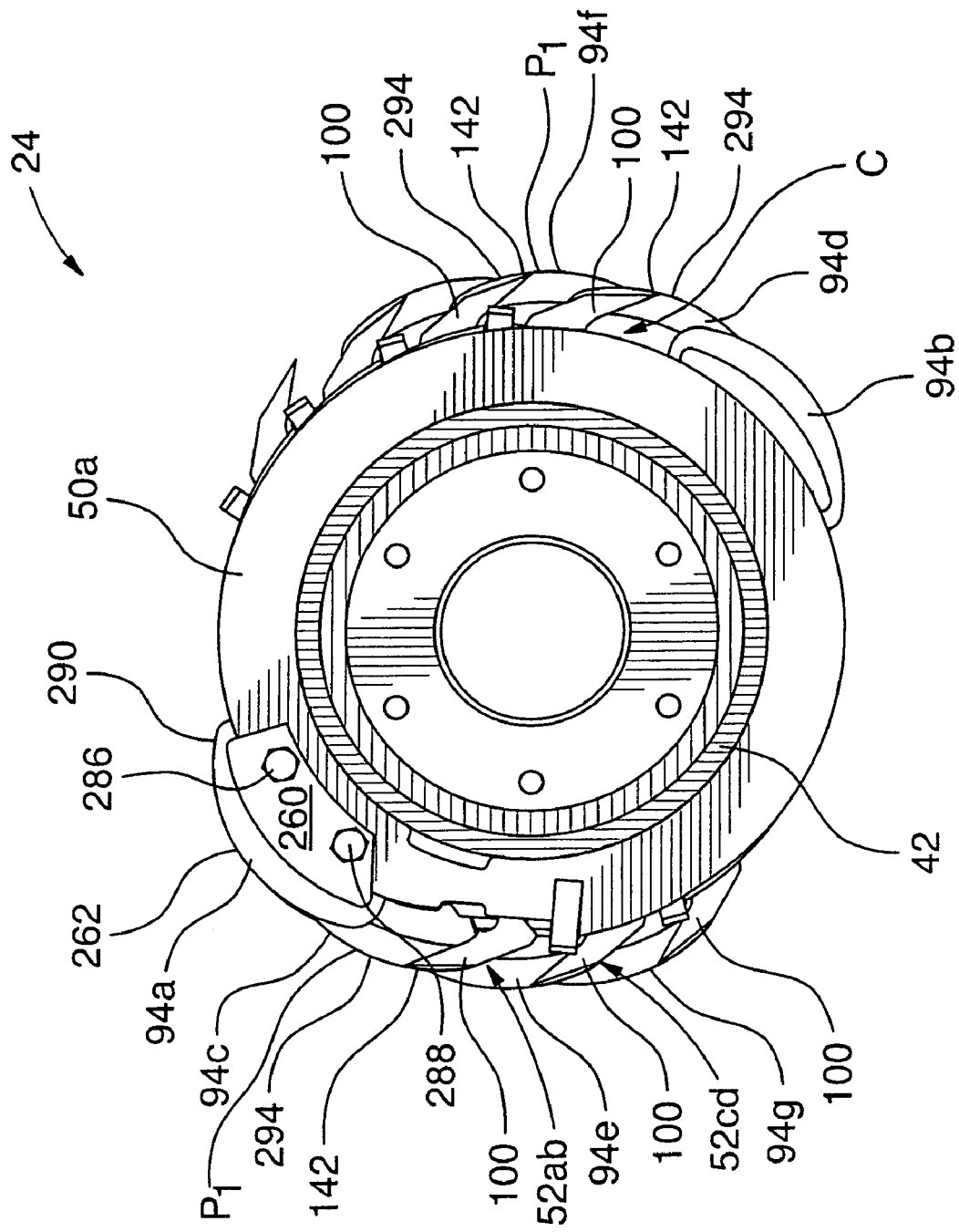
FIG. 5 is an end view of the brush cutting head shown in FIG. 2*b* with a section thereof cut along the line '5-5'.

It can be seen in FIGS. 2a, 3 and 5 that the protective guard members 94 are disposed along the support body 40 according to the first and second helical layouts defined by the mounting stations 52 and cutting teeth assemblies 54. Accordingly, each protective guard member 94 within a respective helical layout is circumferentially staggered from the next adjacent protective guard member 94 in the sequence by an angle $\omega_3$ (measured from the midpoint M of one protective guard member 94 to the midpoint M of the next adjacent protective guard in the sequence) in much the same way as each mounting station 52 is staggered from the next adjacent mounting station 52 in that helical layout. Preferably, the angle $\omega_3$ is an acute angle. In this embodiment, the angle $\omega_3$ shown in FIG. 3 defined between the midpoints M of protective guard members 94r and 94t, is 20 degrees.

Each protective guard member 94 is circumferentially staggered from the guard member adjacent thereto by an angle $\omega_4$ or an angle $\omega_5$. As shown in FIG. 3, the guard member 94t is radially offset from the guard member 94s by an angle $\omega_4$, which in this embodiment is approximately 180 degrees. In contrast, the guard members 94r and 94s are circumferentially staggered from each other by the angle $\omega_5$. In this embodiment, the angle $\omega_5$ is an obtuse angle measuring approximately 160 degrees.

Furthermore, as shown in FIG. 4 the guard member 94t is mounted to collar 50t at a location forwardly of, and radially offset from, the mounting station 52rs by an angle $\omega_6$ as measured from the midpoint M of the protective guard member 94t to the centerline of the cutout 70 defined in the collar 50s. Preferably, the angle $\omega_6$ is an acute angle. In this embodiment, the angle $\omega_6$ measures 28.5 degrees. Preferably, the angle $\omega_6$ lies between 20 and 35 degrees. But it should be appreciated that in alternative embodiments, the angle $\omega_6$ (and correspondingly the position of the guard member 94t relative to the mounting station 52rs) and the angles $\omega_4$ and $\omega_5$ could be varied to suit the particular application.

A clearance C is provided between the trailing extremity of the guard member 94 (i.e. the trailing end 292 of the second plate 262) and the leading extremity of the cutting tooth 100 (i.e. the cutting edge 142). The clearance C facilitates the evacuation of debris away from the cutting tooth 100.

Within a respective helical layout, each cutting tooth assembly 54 tends to be protected by a pair of adjacent guard members 94 in the sequence. For instance, as shown in FIG. 5, guard members 94a and 94c tend to protect the cutting tooth 100 held in mounting station 52ab, while the guard members 94c and 94e tend to shield from damage the cutting tooth 100 in mounting station 52cd. The same applies to the other guard members 94 and their associated cutting tooth assemblies.

In the context of cutting tooth 100 held within the mounting station 52ab, two-fold protection is afforded by guard member 94a and 94c. First, being disposed forwardly (or ahead) of the cutting tooth 100, the guard members 94a and 94c tend to be the first components to make contact with a rock or other hard object as the brush cutting head 24 rotates. Depending on the size of the rock, the convex edges 294 or the leading ends 290 of either guard members 94a and 94c, or both (if the rock is sufficiently large) tend to be the site of first impact for a rock striking the brush cutting head 24. Accordingly, the guard members 94a and 94c may absorb the brunt of the impact and cause the rock to be deflected away from the cutting tooth 100.

Second, the guard member 94c serves to protect the cutting tooth 100 in another way. As best shown in FIGS. 4 and 5, the profile $P_1$ of the second plate 262 encompasses a substantial portion of the cutting portion 110, thereby creating a protective envelope that safeguards the cutting portion 110 from violent impact with hard objects. In this way, should the brush cutting head 24 encounter a large rock during brush cutting operations, there is a greater likelihood that the rock will strike the guard member 94c and be deflected away from the cutting tooth 100 rather than directly impact the cutting portion 110. As a result, the service life of the cutting tooth 100 may be extended and its cutting edge 142 may remain sharp for a longer period of time.

The size of the protective envelope can be varied to suit the particular application. That protective envelope can be made smaller or it can be enlarged to cover the entire cutting portion 110. While it is generally preferred that the cutting edge 142 of the cutting tooth 100 be contained within the protective envelope defined by the profile $P_1$, in some embodiments it may be desirable to configure the profile of the second plate 262 to allow the cutting edge 142 to project beyond (or lie just outside) this protective envelope to allow for more aggressive cutting action by the cutting edge 142.

It will be appreciated that with appropriate modifications the protective guard members described above could be used to protect different cutting tooth assemblies, for instance, those described and shown in United States Patent Application Publication No. 2007/0261763; the contents of which are hereby incorporated by reference.

In further alternative embodiments, the protective guard members could used with a differently configured brush cutting head, one with different collars and different cutting tooth assemblies than the ones shown in FIGS. 2a and 2b. For instance, it may be possible to employ protective guard members in accordance with the principles of the invention on the brush cutting head described in U.S. Pat. No. 6,764,035; the contents of which are hereby incorporated by reference. As the general structure of this brush cutting head (i.e. the collars and the cutting tooth assemblies) is already well known in art, only a very brief description of the structure is provided.

Figure 19:
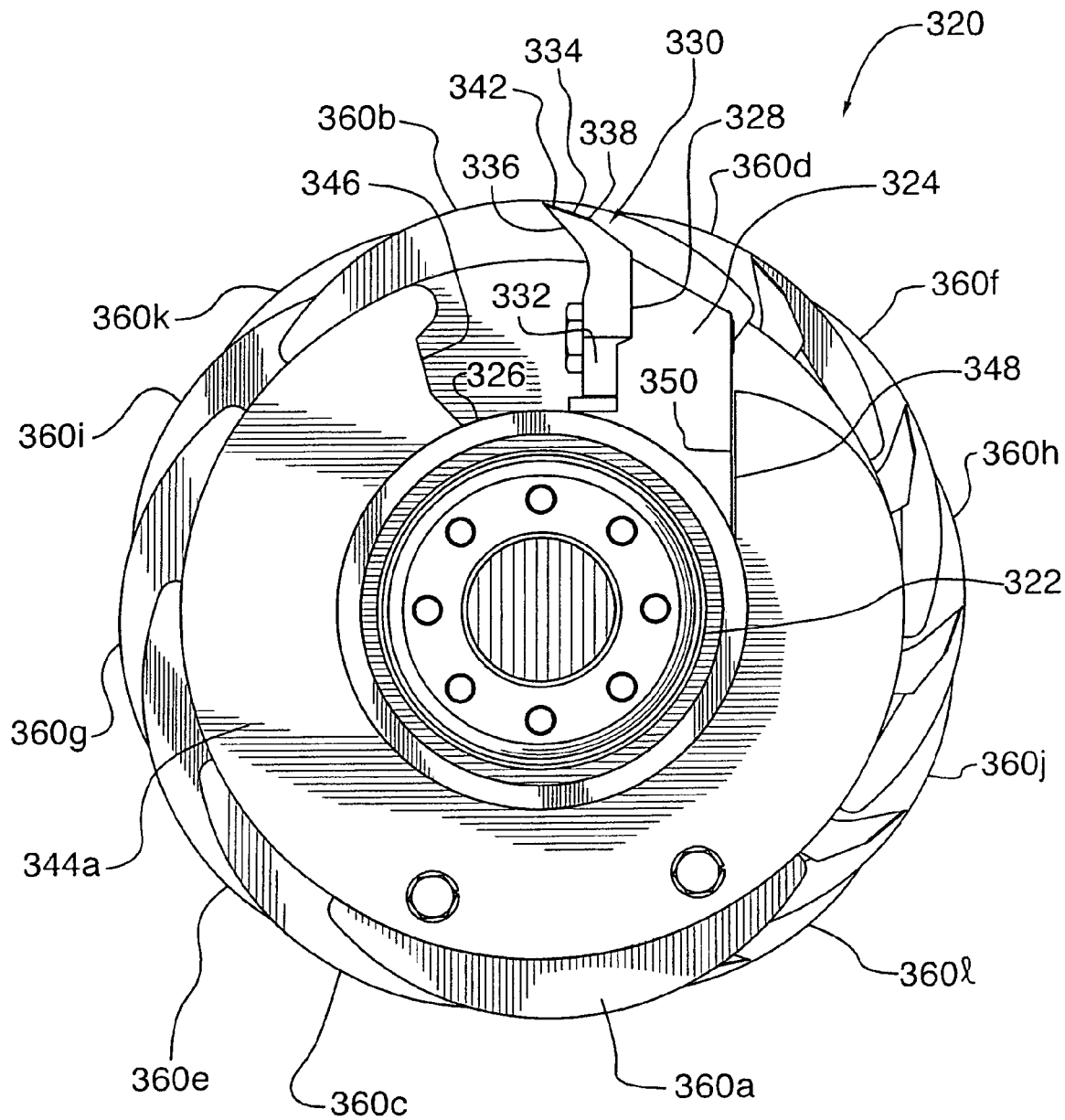
FIG. 19 is an end view of the brush cutting head shown in FIG. 18.

Referring now to FIGS. 18 and 19, there is shown an alternate brush cutting head designated generally with reference numeral 320. The brush cutting head 320 has a cylindrical support base or body 322 with an outer surface 326 and a plurality of cutting tooth mounting blocks 324a to 324w (collectively, "mounting blocks 324") fastened to the outer surface and disposed in a generally double helix pattern along the support body 322. Each mounting block 324 is circumferentially staggered from the mounting block adjacent thereto. As a result of this staggered arrangement, every alternate mounting block 324 is also radially offset from its respective reference mounting block by an angle $\beta_1$. Taking as an example mounting blocks 324a and 324c, it can be seen in FIG. 18 that mounting block 324a is circumferentially staggered relative to station 324c by an angle $\beta_1$. While in this embodiment, the angle pi measures approximately 30 degrees, it may be varied in other embodiments.

Each mounting block 324 carries on its leading face 328 a cutting tooth 330. In this embodiment, each mounting block 324 and cutting tooth 330 combination defines a cutting tooth assembly. The cutting tooth 330 has a base portion 332 fastenable to the mounting block 322 and a cutting portion 334. The cutting portion 334 is carried on the base portion 332 in a generally, forwardly leaning or canted fashion, and is integrally formed with the base portion 332. The cutting portion 334 has a leading face 336 and an opposed trailing face 338 which cooperate with each other to define a tapering, wedge-like, profile that terminates in a cutting edge 342. The cutting edge 342 is carried forwardly of the base portion 332 such that it tends to be the first element of cutting tooth 330 to make contact with the brush.

The brush cutting head 320 is further provided with a plurality of collars 344a to 344w (collectively, "collars 344")—one for each mounting block 324. Each collar 344 is radially offset from its adjacent collar 344 by an angle corresponding to angle $\beta_1$. Each collar 344 has a generally penannular structure with a first end 346, a second end 348 and a relatively large space S disposed between the first and second ends 346 and 348. Each protective collar 344 is welded to the outer surface 326 of the support body 322 and extends radially therefrom, transverse to the longitudinal axis of the support body 322. Each collar 344 terminates with its respective first end 346 circumferentially spaced from the leading face 328 of the mounting block 324. At its respective second end 348, each collar 344 is welded to the trailing face 350 of the mounting block 324 to which it is associated.

To further protect or shield the mounting blocks 324 and the cutting teeth 330 mounted within them from violent impact with large rocks or the like, each of the collars 344 has attached thereto a protective guard member 360. While in the embodiment shown in FIG. 2a and 2b, there only protective guard member provided for each collar, it will be appreciated that this need not be the case in every application. In a modified brush cutting head, each collar could carry two protective guard members circumferentially staggered from each other.

Figure 21:
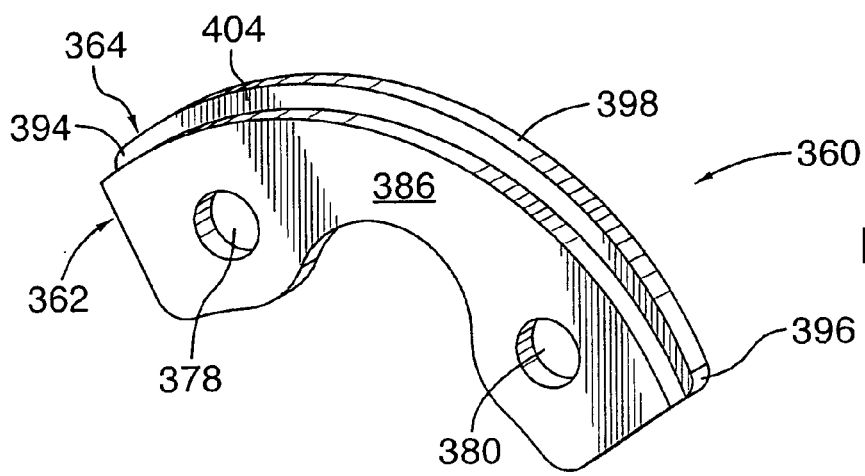
FIG. 21 is a top left perspective view of one of the guard members shown in FIG. 18.
Figure 22:
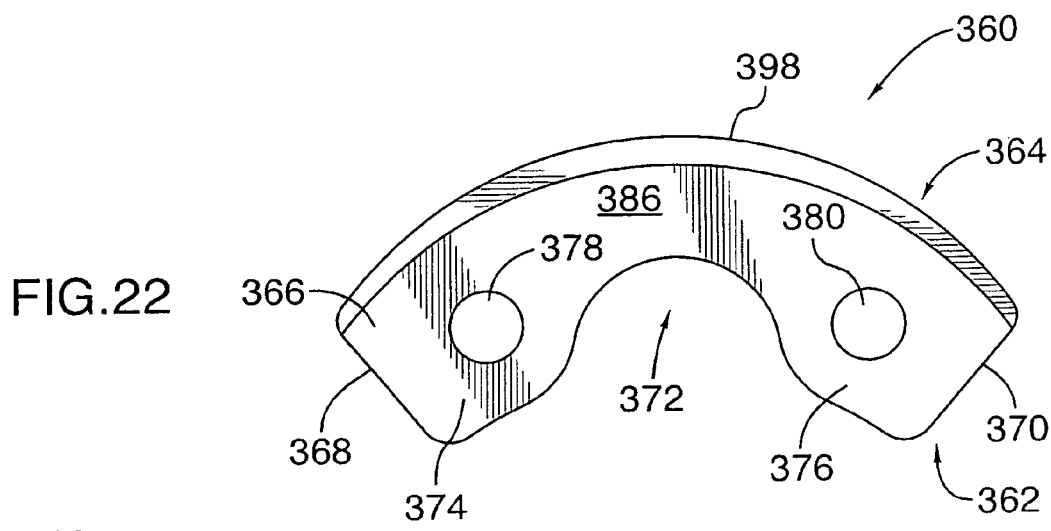
FIG. 22 is a side elevation view of the guard member shown in FIG. 21.
Figure 23:
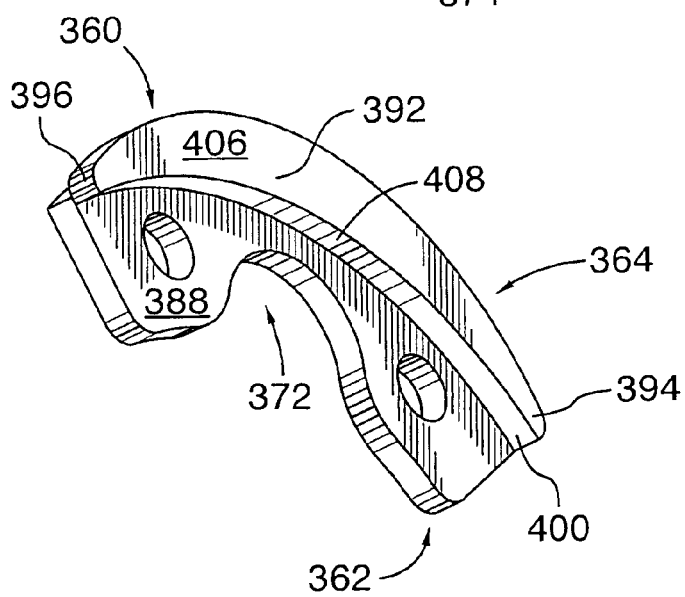
FIG. 23 is a bottom right perspective view of the guard member shown in FIG. 21.

With reference to FIGS. 21 to 23, it will be seen that the guard member 360 is generally similar to the guard member 94 earlier described in that it is also fabricated from two steel plates that are welded to each other—a first plate 362 attachable to a collar 344 and a second plate 364.

The first plate 362 however differs from its counterpart (first plate 260) in guide member 94. It has a generally arcuate body 366 provided with a first end 368 and a second end 370. At a location intermediate the first and second ends 368 and 370, a concavity 372 has been machined out of the body 366 thereby defining a first lobe 374 and a second lobe 376. Defined in each lobe 374 and 376 is a bore 378, 380 for receiving therethrough a fastener in the nature of a bolt 382, 384 to fix the guard member 360 to the collar 344. The first plate 362 also has an outer face 386 and an opposed inner face 388. The inner face 388 abuts the face 390 of collar 344 when the guard member 360 is mounted to the collar 344.

Figure 15:
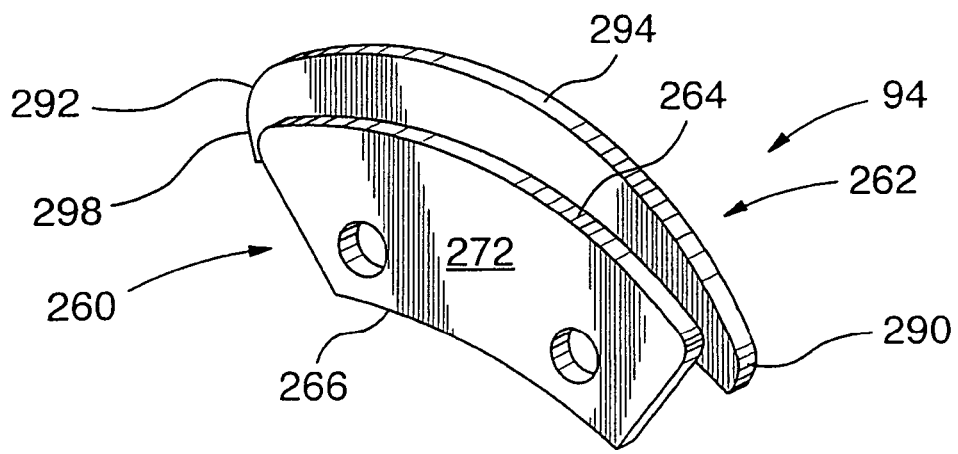
FIG. 15 is a top left perspective view of one of the guard members shown in FIG. 5.

The second plate 364 in this embodiment has a crescent shaped body 392, but its profile $P_2$ differs from that of the second plate 262 shown in FIGS. 15 to 17. The crescent shape of the body 392 has a first leading end 394 and a second trailing end 396. The midpoint between the first leading end 394 and the second trailing end 396 defines the midpoint M of the protective guard member 360. The profile $P_2$ is defined by a first convex edge 398 and an opposed second concave edge 400 extending between the leading and trailing ends 394 and 396. Similar to the surface along first convex edge 294, the surface along the first convex edge 398 may be subjected to a hard-facing treatment to enhance wear, impact and abrasion resistance. The second concave edge 400 is shaped to conform substantially to the curved profile of the outer edge 402 of the collar 344. Unlike ends 290 and 292 of the second plate 262, in this embodiment, the leading end 392 is a mirror image of the trailing end 394.

In like fashion to the first plate 362, the second plate 364 also has two opposed faces 404 and 406. The inner face 388 of the first plate 362 is welded to the face 404 of the second plate 364. The thickness of the second plate 364 as measured between the faces 404 and 406 matches or at least corresponds substantially to, the thickness of the collar 344 as measured between its opposite faces.

As best shown in FIG. 23, the guard member 360 has a shoulder 408 which is generally similar in shape and function to the shoulder 304 of guard member 94. In this embodiment, the shoulder 408 is defined by the second concave edge 400 of the second plate 364 and the inner face 388 of the first plate 362 and is adapted to abut the outer edge 402 and the face 410 of the collar 344 when the guard member 360 is mounted to the collar 344.

The installation of guard members 360 is accomplished in like fashion to that of guard members 94. A respective guard member 360 is placed onto its associated collar 344 such that the shoulder 406 abuts the outer edge 402 and face 410 of the collar 344. The bores 378 and 380 in the first plate 362 are aligned with corresponding bores (not shown) defined in the collar 344. Thereafter, the bolts 382 and 384 are introduced through the aligned bores and securely fastened with nuts 412, 414.

The protective guard members 360 are disposed along the support body 322 according to the first and second helical layouts defined by the mounting blocks 324 and the cutting teeth 330. Accordingly, each protective guard member 360 within a respective helical layout is circumferentially staggered from the next adjacent protective guard member 360 in the sequence by an angle $\beta_2$ corresponding to angle $\beta_1$ in much the same way as each mounting block 324 is staggered from the next adjacent mounting block 324 in that helical layout. Preferably, the angle $\beta_2$ (like angle $\beta_1$) is an acute angle. In this embodiment the angle $\beta_2$ measures 30 degrees.

Figure 20:
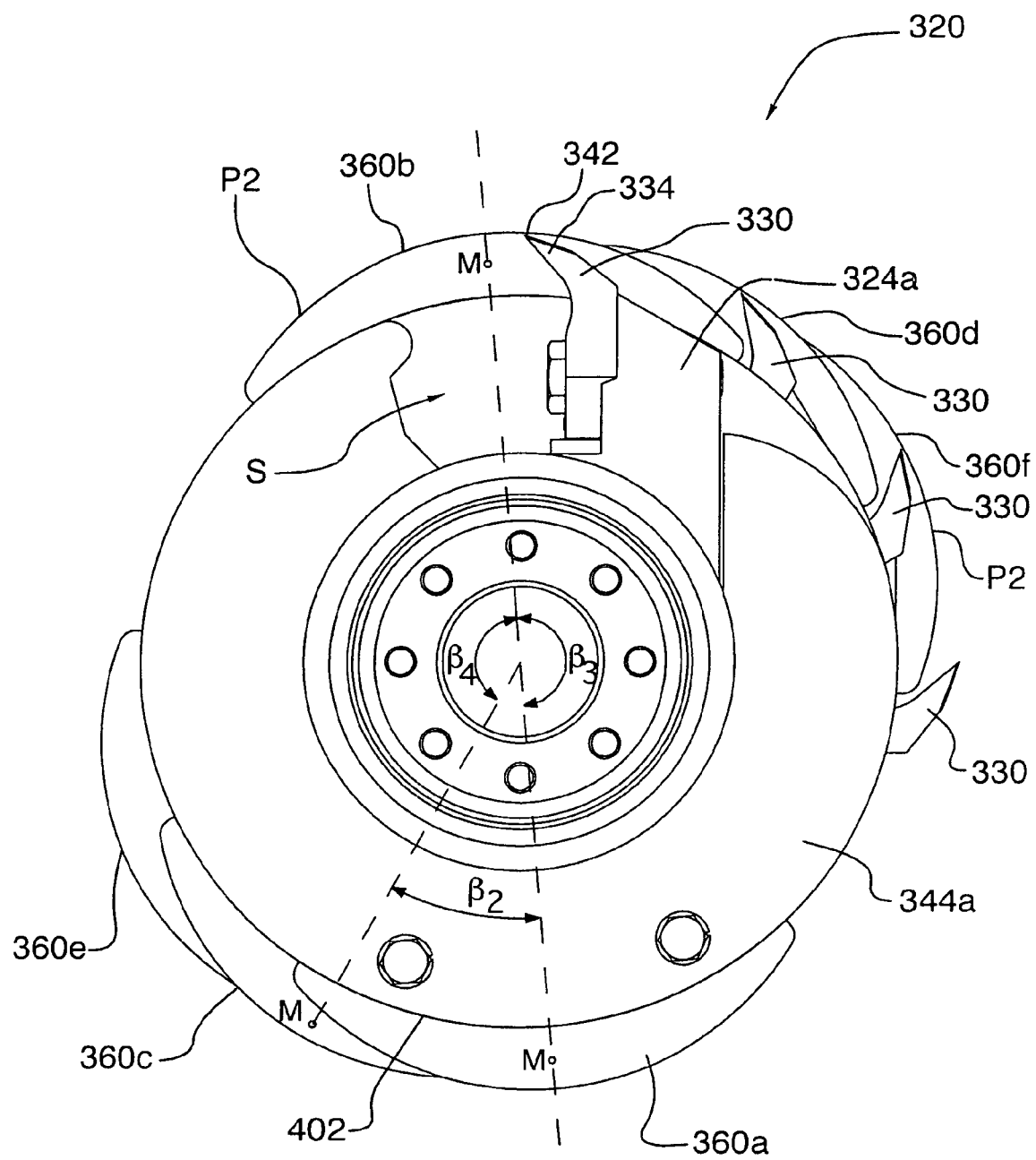
FIG. 20 is an end view of the brush cutting head shown in FIG. 18 with a section thereof cut along the line '20-20'.

Each protective guard member 360 is circumferentially staggered from the guard member adjacent thereto by an angle $\beta_3$ or an angle $\beta_4$. As shown in FIG. 20, the guard member 360a is radially offset from the guard member 360b by an angle $\beta_3$. In this embodiment, the angle $\beta_3$ measures approximately 180 degrees. In contrast, the guard members 360b and 360c are circumferentially staggered from each other by the angle $\beta_4$, which in this embodiment is approximately 150 degrees.

In contrast to the guard member 94t shown in FIG. 2a which is mounted to the collar 50t adjacent the mounting station 52tu, each guard member 360 is mounted to a collar 344 at a location almost directly opposite or at least substantially opposed to the space S defined between the first and second ends 346 and 348 within which the mounting block 324 lies. It will be appreciated that in other embodiments, the guard members 360 could be positioned differently relative to the space S.

Within a respective helical layout, each mounting block 324 and cutting tooth 330 combination is protected by the pair of guard members 360 in the sequence that are mounted to collars disposed on either side of the mounting block and cutting tooth combination. For instance, as shown in FIG. 20, guard members 360b and 360d tend to protect the cutting tooth 330 held in mounting block 324c, while the guard members 360d and 360f tend to shield from damage the cutting tooth 330 in mounting block 324e. The same applies to the other guard members 360 and their associated mounting block and cutting teeth combinations.

Generally speaking, the pair guard members 360a and 360c protects the cutting tooth 330 held within the mounting block 324a, in much the same way as the guide members 94a and 94c described earlier. Being disposed forwardly (or ahead) of the cutting tooth 330, the guard members 360a and 360c tend to be the first components to make contact with a rock or other hard object as the brush cutting head 320 rotates. Depending on the size of the rock, the convex edges 398 or the leading ends 370 of either guard members 360a and 360c, or both (if the rock is sufficiently large) tend to be the site of first impact for a rock striking the brush cutting head 320. Additionally, by having the profile $P_2$ of the second plate 362 encompass a substantial portion of the cutting portion 334, the guard member 360c creates a protective envelope that safeguards the cutting portion 334 from violent impact with hard objects.

In this embodiment, the entire cutting portion 334 (not just the cutting edge 342) is contained within the protective envelope defined by the profile P₂ of the second plate 362. However, in alternative embodiments, the size of the protective envelope may be reduced or enlarged as required.

For reasons of versatility, it is generally preferred that the protective guard members be releasably mounted or attached to the collars (as is the case in the embodiments shown in FIGS. 2a and 18) since this allows the brush cutting head to be flexibly tooled to adapt to field conditions. For example, the operator of a brush cutter may not want to have the protective guard members installed when clearing brush from sandy terrain that does not have many large rocks. In such cases, the operator may choose to remove the protective guards to lighten the brush cutting head and reduce the energy consumption and power draw on the motor. Additionally, should a protective guard member be damaged or require servicing, it can easily be removed and replaced with another. Along the same vein, in certain applications, an operator may elect to have only selected collars outfitted with protective guard members, while the remaining collars are not provided with any guard members.

On the other hand, if a particular brush cutting head is intended to be employed on very rocky terrain, it may be practical to have the protective guard members mounted on the collars at all times. In such instances, it is contemplated that the protective guard members could be permanently fixed to the collars. In one such embodiment, a crescent-shaped plate similar to the second plate 262 (see FIG. 15) or the second plate 364 (see FIG. 21) could have its concave edge welded to the outer edge of the collar. In another embodiment, a collar could be fabricated with a protective guard member integrally formed therein, that is, the protective guard could be incorporated into the design and structure of the collar itself.

In other embodiments, an alternate brush cutting head could be outfitted with a combination of protective guard members in accordance with the principles of the invention. That is, such a brush cutting head could have some protective guard members that are fixedly mounted to, and/or integrally formed with, their respective collars and others that are releasably attached to their respective collars.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. A brush cutting head comprising:
a support body having a first end, an opposed second end and an intermediate portion extending therebetween; the intermediate portion having an outer surface;
a plurality of collars mounted to the support body at spaced intervals along the intermediate portion, each collar extending outwardly from the outer surface;
a plurality of cutting teeth carried on the outer surface of the support body, each cutting tooth being associated with at least one collar;
at least one guard member for protecting at least one cutting tooth of the plurality from impacts with hard objects, the at least one guard member being carried on one of the collars with at least a portion thereof projecting beyond the outermost edge of the one collar;
wherein:
the plurality of collars includes first, second, third and fourth collars; the second collar being disposed between the first the third collars; the third collar being disposed between the second and fourth collars;
the at least one guard member including first, second, third and fourth guard members; the first guard member being carried on the first collar, the second guard member being carried on the second collar, the third guard member being carried on the third collar and the fourth guard member being carried on the fourth collar;
the support body is a cylindrical support body;
the outer surface of the support body is a curved surface defining the circumference of the support body;
the first guard member is circumferentially spaced from the second guard member;
the second guard member is circumferentially spaced from the third guard member;
the third guard member is circumferentially spaced from the fourth guard member;
the plurality of cutting teeth includes first, second and third cutting teeth; the first cutting tooth being mounted between the first and second collars, the second cutting tooth being mounted between the second and third collars, the third cutting tooth being mounted between the third and fourth collars;
the second guard member is disposed forwardly of the first cutting tooth;
the third guard member is disposed forwardly of the second cutting tooth;
the fourth guard member is disposed forwardly of the third cutting tooth;
the outermost edge of each of the first and second guard members defines a protective envelope;
the protective envelope defined by the first guard member at least partially encompasses the second cutting tooth;
the protective envelope defined by the second guard member at least partially encompasses the third cutting tooth;
each cutting tooth has a cutting portion terminating with a leading cutting edge; and
the protective envelope defined by the first guard member substantially encompasses the cutting portion of the second cutting tooth.

2. The brush cutting head of claim 1 wherein the at least one guard member has an outermost margin, the outermost margin defining a protective envelope that at least partially encompasses the at least one cutting tooth.

3. The brush cutting head of claim 1 wherein:
the first guard member is circumferentially spaced from the third guard member by a first acute angle;
the second guard member is circumferentially spaced from the fourth guard member by a second acute angle; and
the first acute angle equals the second acute angle.

4. The brush cutting head of claim 1 wherein:
the first guard member is circumferentially spaced from the second guard member by a first obtuse angle;
the third guard member is circumferentially spaced from the fourth guard member second obtuse angle; and
the first obtuse angle equals the second obtuse angle.

5. The brush cutting head of claim 4 wherein the second guard member is positioned so as to be substantially opposed to the third guard member.

6. The brush cutting head of claim 1 wherein the protective envelope defined by the first guard member entirely encompasses the cutting edge of the second cutting tooth.

7. A brush cutting head comprising:
a support body having a first end, an opposed second end and an intermediate portion extending therebetween; the intermediate portion having an outer surface;
a plurality of collars mounted to the support body at spaced intervals along the intermediate portion, each collar extending outwardly from the outer surface;

a plurality of cutting teeth carried on the outer surface of the support body, each cutting tooth being associated with at least one collar; and at least one guard member for protecting at least one cutting tooth of the plurality from impacts with hard objects, the at least one guard member being carried on one of the collars with at least a portion thereof projecting beyond the outermost edge of the one collar;

wherein:

the plurality of collars includes first, second, third and fourth collars; the second collar being disposed between the first and third collars; the third collar being disposed between the second and fourth collars;

the at least one guard member including first, second, third and fourth guard members; the first guard member being carried on the first collar, the second guard member being carried on the second collar, the third guard member being carried on the third collar and the fourth guard member being carried on the fourth collar;

the support body is a cylindrical support body;

the outer surface of the support body is a curved surface defining the circumference of the support body;

the first guard member is circumferentially spaced from the second guard member the second guard member is circumferentially spaced from the third guard member;

the third guard member is circumferentially spaced from the fourth guard member;

the plurality of cutting tooth includes first, second, third and fourth cutting tooth; the first cutting tooth being associated with the first collar; the second cutting tooth being associated with the second collar; the third cutting tooth being associated with the third collar; the fourth cutting tooth being associated with the fourth collar;

the outermost edge of each of the first, second, third and fourth guard members defines a protective envelope;

the protective envelope defined by the first guard member at least partially encompasses the second cutting tooth;

the protective envelope defined by the second guard member at least partially encompasses the first cutting tooth;

the protective envelope defined by the third guard member at least partially encompasses the fourth cutting tooth;

the protective envelope defined by the fourth guard member at least partially encompasses the third cutting tooth;

each cutting tooth has a cutting portion terminating with a leading cutting edge, and the protective envelope defined by the first guard member substantially encompasses the cutting portion of the second cutting tooth.

8. The brush cutting head of claim 7 wherein the protective envelope defined by the first guard member entirely encompasses the cutting edge of the second cutting tooth.

9. The brush cutting head of claim 7 wherein the protective envelope defined by the first guard member entirely encompasses the second cutting tooth.

10. The brush cutting head of claim 7 wherein each caning tooth has a cutting portion terminating with a leading cutting edge; and the plurality of cutting tooth includes first, second, third and fourth cutting tooth; the first cutting tooth being associated with the first collar; the second cutting tooth being associated with the second collar; the third cutting tooth being associated with the third collar; the fourth cutting tooth being associated with the fourth collar; and each of the first, second, third and fourth guard members has a leading end and a trailing end; the leading end of the second guard member being disposed forwardly of the leading cutting edge.

11. A brush cutting head comprising:

a support body having a first end, an opposed second end and an intermediate portion extending therebetween; the intermediate portion having an outer surface;

a plurality of collars mounted to the support body at spaced intervals along the intermediate portion, each collar extending outwardly form the outer surface;

a plurality of cutting teeth carried on the outer surface of the support body, each cutting tooth being associated with at least one collar; and at least one guard member for protecting at least one cutting tooth of the plurality from impacts with hard objects, the at least one guard member being carried on the one of the collars with at least a portion thereof projecting beyond the outermost edge of the one collar;

wherein:

the at least one guard member has a first portion mounted to the one collar and the second portion joined to the first portion;

the portion of the at least one guard member projecting beyond the outermost edge of the one collar corresponds substantially to the second guard member portion;

the one collar has a substantially penannular structure defined by a circumferentially extending sidewall, the sidewall having an inner edge fixed to the outer edge of the support body and an outer edge, the outer edge of the sidewall corresponding to the outermost edge or the one collar;

the first guard member portion is releasably attached to the sidewall of the one collar;

the second portion includes a crescent-shaped body defined substantially by a convex edge and an opposed concave edge;

the convex edge defines the outermost margin of the at least one guard member; and the concave edge conforms substantially to the curvature of the outer edge of the sidewall.

12. The brush cutting head of claim 11 wherein the first portion is welded to the second portion.

13. The brush cutting head of claim 11 wherein the first portion is integrally formed with the second portion.

14. The brush cutting head of claim 11 wherein the first portion is releasably attached to the second portion.

15. The brush cutting head of claim 11 wherein:

the one collar has a substantially penannular structure defined by a circumferentially extending sidewall, the sidewall having an inner edge fixed to the outer edge of the support body and an outer edge, the outer edge of the sidewall corresponding to the outermost edge of the one collar and the first guard member portion is releasably attached to the sidewall of the one collar.

16. The brush cutting head of claim 15 wherein the second guard member portion is at least partially supported on the outer edge of the sidewall.

17. The brush cutting head of claim 11 wherein:

each of the first and second guard member portions has an abutment face and an opposite face;

at the juncture between the first and second guard member portions, the abutment face of the first guard member portion bears against the abutment face of the second guard member portion along a margin; and a portion of the abutment fare of the first guard member portion cooperates with the concave edge of the second guard member portion to define a shoulder, the shoulder abutting a portion of the sidewall and outer edge of the one collar.

18. The brush cutting head of claim 11 wherein;

each of the first and second guard member portions has an abutment face and an opposite face;

in the vicinity of the convex edge, the second guard member portion has a thickness measured between the abutment face and opposite face thereof;

the thickness of the second guard member portion in the vicinity of the convex edge corresponds substantially to the thickness of the collar as measured between the opposed faces thereof.

19. The brush cutting head of claim 11 wherein the crescent-shaped body has a leading end and a trailing end, the leading end being a mirror image of the trailing end.

20. The brush cutting head of claim 11 wherein the crescent-shaped, body has a leading end and a trailing end, the trailing end terminating with a bull-nose tip to provide increased protective coverage for the at least one cutting tooth.

21. The brush cutting head of claim 11 wherein the second guard member portion has a curved edge constituting the outermost margin of the at least one guard member, the curved edge defining a protective envelope that at least partially encompasses the at least one cutting tooth.

22. The brush cutting head of claim 11 wherein the curved edge is a convex edge.

23. The brush cutting head of claim 11 wherein the at least one guard member is releasably attached to the one collar.

24. The brush cutting head of claim 11 wherein the at least one guard member is fixedly mounted to the one collar.

25. The brush cutting head of claim 11 wherein the at least one guard member is integrally formed with the one collar.

* * * * *